United States Patent
Ohashi et al.

(10) Patent No.: US 7,604,866 B2
(45) Date of Patent: Oct. 20, 2009

(54) ANTIREFLECTION FILM

(75) Inventors: Toshihiko Ohashi, Fuji (JP); Takaaki Ioka, Fuji (JP)

(73) Assignee: Asahi Kasei Kabushiki Kaisha, Osaka-shi, Osaka (JP)

( * ) Notice: Subject to any disclaimer, the term of this patent is extended or adjusted under 35 U.S.C. 154(b) by 350 days.

(21) Appl. No.: 10/561,000

(22) PCT Filed: Jun. 10, 2004

(86) PCT No.: PCT/JP2004/008505

§ 371 (c)(1), (2), (4) Date: Dec. 16, 2005

(87) PCT Pub. No.: WO2004/113966

PCT Pub. Date: Dec. 29, 2004

(65) Prior Publication Data

US 2006/0269724 A1    Nov. 30, 2006

(30) Foreign Application Priority Data

Jun. 18, 2003    (JP) ............................. 2003-173447

(51) Int. Cl.
*B32B 15/04* (2006.01)
*C09K 19/42* (2006.01)
*C04B 35/14* (2006.01)

(52) U.S. Cl. .................... 428/446; 428/297.4; 428/325; 428/480

(58) Field of Classification Search .................. 428/49, 428/327, 402, 412, 421, 495.1, 688, 696, 428/699, 1.23, 846.3, 446; 359/601, 586; 501/53, 154

See application file for complete search history.

(56) References Cited

U.S. PATENT DOCUMENTS

| | | | | |
|---|---|---|---|---|
| 4,866,746 A | * | 9/1989 | Nakahigashi et al. | 378/35 |
| 5,476,717 A | * | 12/1995 | Floch | 428/421 |
| 5,585,186 A | * | 12/1996 | Scholz et al. | 428/412 |
| 5,991,081 A | * | 11/1999 | Haaland et al. | 359/589 |
| 6,251,523 B1 | | 6/2001 | Takahashi et al. | |
| 2002/0085284 A1 | * | 7/2002 | Nakamura et al. | 359/601 |

FOREIGN PATENT DOCUMENTS

| | | |
|---|---|---|
| JP | 3-150501 A | 6/1991 |
| JP | 4-340902 A | 11/1992 |
| JP | 5-163464 A | 6/1993 |
| JP | 7-48117 A | 2/1995 |
| JP | 9-80204 A | 3/1997 |
| JP | 11-292568 A | 10/1999 |
| JP | 2000-256040 A | 9/2000 |

(Continued)

OTHER PUBLICATIONS

Toshiaki 2002-079600 machine translation.*

*Primary Examiner*—Timothy M Speer
*Assistant Examiner*—Lauren Robinson
(74) *Attorney, Agent, or Firm*—Birch, Stewart, Kolasch & Birch, LLP

(57) ABSTRACT

An antireflection film comprising silica particles and at least one binder compound, which has a silica particle content of 30% by weight or more, an arithmetic mean surface roughness (Ra) of not more than 2 nm, and a surface silicon atom content of 10 atom % or more.

18 Claims, 5 Drawing Sheets

FOREIGN PATENT DOCUMENTS

| | | | |
|---|---|---|---|
| JP | 2001-163906 A | 6/2001 |
| JP | 2001-188104 | 7/2001 |
| JP | 2002-079600 * | 3/2002 |
| JP | 2002-79600 A | 3/2002 |
| JP | 2002-221603 A | 8/2002 |
| WO | WO-03-083524 A1 | 10/2003 |

* cited by examiner

ANTIREFLECTION FILM

BACKGROUND OF THE INVENTION

1. Field of the Invention

The present invention relates to an antireflection film. More particularly, the present invention is concerned with an antireflection film comprising silica particles and at least one binder compound, wherein the silica particles are bound together through the at least one binder compound, and wherein the antireflection film has a silica particle content of 30% by weight or more, an arithmetic mean surface roughness (Ra) of not more than 2 nm and a surface silicon atom content of 10 atom % or more. The antireflection film of the present invention not only exhibits excellent antireflection performance, but also has excellent properties with respect to mechanical strength and abrasion resistance. Therefore, the antireflection film of the present invention is very advantageous for coating various optical substrates (such as lenses of eye-glass and display screens).

2. Prior Art

Conventionally, as an antireflection film for coating an optical part, lenses of eye-glasses, a display screen or the like, there are known an antireflection film having a single-layer structure and an antireflection film having a multilayer structure. An antireflection film having a single-layer structure or a double-layer structure has disadvantageously high reflectance. Therefore, it has been considered to be more desirable to use an antireflection film having a laminated structure comprised of three or more different layers having different refractive indices. However, when such an antireflection film comprised of three or more different layers is produced by any of the conventional methods, such as vacuum deposition and dip coating, disadvantages are caused in that the production process is cumbersome and also the productivity is low.

Therefore, studies have been made on antireflection films having a single-layer structure or a double-layer structure, and it has been found that the refractive index of such a single-layer or double-layer antireflection film can be reduced when the antireflection film satisfies the conditions mentioned below. Thus, studies have been made for developing a single-layer or double-layer film which satisfies such conditions. Specifically, it is known that, in the case of an optical part comprising a substrate and, formed thereon, a single-layer film, the minimum value of the reflectance R of the optical part can be expressed by the formula:

$(n_s-n^2)^2/(n_s+n^2)^2$, wherein $n_s$ represents the refractive index of the substrate and n represents the refractive index of the single-layer film, with the proviso that $n_s>n$. When the minimum value of the reflectance R is 0 (i.e., when $(n_s-n^2)^2/(n_s+n^2)^2=0$), it means that $n=n_s^{1/2}$. Therefore, it has been attempted to reduce the reflectance R by adjusting the refractive index n of the single-layer film to a value which is as close as possible to $n_s^{1/2}$. Further, when it is difficult to adjust the refractive index n of the single-layer film to a value which is close to $n_s^{1/2}$, it has also been attempted to reduce the reflectance R by a method in which a high refraction layer having a high refractive index which is close to $n^2$ is formed between the substrate and the above-mentioned single-layer film having a refractive index n, to thereby obtain a double layer structure.

At present, commercially available products of optical parts having an antireflection film have a minimum reflectance of about 2% in the visible range. However, of these commercially available optical parts, the number of those optical parts having both a minimum reflectance of 2% or less and practically satisfactory properties with respect to mechanical strength and durability, is very small. Therefore, it has been desired to provide an antireflection film which can be easily produced and which has both a minimum reflectance of 2% or less, preferably a minimum reflectance of 1% or less and practically satisfactory properties with respect to mechanical strength and durability.

On the other hand, for the purpose of providing an antireflection film having an increased surface hardness and an anti-dazzling property (achieved by a light scattering property imparted to the surface of the film), it has been attempted to incorporate silica particles into the surface portion of an antireflection film to thereby form minute unevenness (i.e., minute dents and bumps) on the surface of the antireflection film. It is known that, by forming minute dents and bumps on the surface of the antireflection film in such way, there can be obtained, to some extent, the effect of improving the abrasion resistance of the antireflection film. The reason why such effect can be obtained is that the presence of the minute dents and bumps on the surface of the antireflection film can decrease the practical contact area between the antireflection film and an object which placed in contact with the surface of the antireflection film. However, an antireflection film having such a surface structure has posed a problem in that a stress applied to such a roughened surface of the antireflection film is inevitably mainly focused on the minute "peak top" portions (i.e., dents) of the roughened surface and, hence, the surface portion of the antireflection film is partially scraped off and/or the antireflection film is partially crushed in the thicknesswise direction, leading to a partial lowering of thickness of the antireflection film, and this will cause an inadvertent change in the color tone of the antireflection film. When it is tried to solve this problem by a method in which the amount of silica particles used is increased in an attempt to further increase the surface hardness of the antireflection film, the surface roughness of the antireflection film is further increased. This increase in the surface roughness poses problems not only in that there occurs an increase in the frictional resistance when the antireflection film is placed in contact with an object, but also in that there occurs an increase in the coming off of silica particles from the surface of the antireflection film, thus leading to even a lowering of the abrasion resistance (and not an increase in the abrasion resistance). Thus, in the conventional techniques, it is very difficult to control the surface morphology and surface hardness of an antireflection film.

Unexamined Japanese Patent Application Laid-Open Specification Nos. Hei 3-150501 and Hei 5-163464 disclose an antireflection film containing silica particles and having minute dents and bumps on the surface thereof. In these patent documents, these antireflection films are described to show good results in the evaluation of the abrasion resistance. However, in these patent documents, the abrasion resistance is evaluated simply by a method in which an antireflection film is subjected to rubbing using a stationery eraser. It is believed that, by such method, the practical performance of an antireflection film cannot be satisfactorily evaluated.

Unexamined Japanese Patent Application Laid-Open Specification Nos. Hei 11-292568 and 2000-256040 disclose an antireflection film containing silica particles and having an arithmetic mean surface roughness (Ra) of more than 5 nm. In these patent documents, it is described that, when the antireflection film was subjected to measurement of the abrasion resistance by rubbing the antireflection films with a dry cloth, the water contact angle of the antireflection film changed from 107° to 100°. Such results of the evaluation cannot be considered to show that the antireflection film exhibits a satisfactory practical performance.

Unexamined Japanese Patent Application Laid-Open Specification Nos. Hei 4-340902, Hei 7-48117, 2001-188104 and 2001-163906 disclose an antireflection film containing silica particles. However, in the techniques of these patent documents, the use of silica particles is simply intended to improve the optical performance of the antireflection film. In these patent documents, an antireflection film having a low refractive index and a low reflectance is obtained, but the abrasion resistance of the antireflection film is still unsatisfactory.

Unexamined Japanese Patent Application Laid-Open Specification No. 2002-221603 discloses an antireflection film transfer structure comprising a substrate having an arithmetic mean surface roughness (Ra) of from 2 to 150 nm and, laminated thereon, an antireflection layer to be transferred, and also discloses an antireflection film obtained using the antireflection film transfer structure. In this patent document, the purpose of adjusting the arithmetic mean surface roughness (Ra) of the substrate to a value within the range of from 2 to 150 nm is to improve the uniformity of thickness of the antireflection film obtained. This patent document has no description about how the above-mentioned adjustment of the arithmetic mean surface roughness (Ra) contributes to the strength of the antireflection film.

Further, it is known that when an antireflection film is caused to have a surface morphology having only few dents and bumps, i.e., a flat surface, the abrasion resistance of the antireflection film is lowered. For example, International Publication No. WO03/083524 discloses an antireflection film containing silica particles, and has a description that, when the arithmetic mean surface roughness (Ra) of the antireflection film is less than 3 nm, a satisfactory abrasion resistance is not likely to be exhibited. Also, Unexamined Japanese Patent Application Laid-Open Specification No. 2002-79600 discloses an antireflection film containing silica particles, and has a description that, when the arithmetic mean surface roughness (Ra) of the antireflection film is less than 2 nm, a lowering of abrasion resistance occurs.

As described hereinabove, there has not yet been able to be obtained an antireflection film which not only exhibits excellent antireflection performance, but also has satisfactory properties with respect to mechanical strength and abrasion resistance.

SUMMARY OF THE INVENTION

In this situation, the present inventors have made extensive and intensive studies with a view toward solving the above-mentioned problems accompanying the prior art. As a result, the present inventors have unexpectedly found that the above objective can be attained by an antireflection film comprising silica particles and at least one binder compound, wherein the silica particles are bound together through the at least one binder compound, and wherein the antireflection film has a silica particle content of 30% by weight or more, an arithmetic mean surface roughness (Ra) of not more than 2 nm and a surface silicon atom content of 10 atom % or more. That is, it has surprising been found that the above-mentioned antireflection film not only exhibits excellent antireflection performance, but also has excellent properties with respect to mechanical strength and abrasion resistance. The present invention has been completed, based on this finding.

Accordingly, it is an object of the present invention to provide an antireflection film which not only exhibits excellent antireflection performance, but also has excellent properties with respect to mechanical strength and abrasion resistance.

The foregoing and other objects, features and advantages of the present invention will be apparent from the following detailed description taken in connection with the accompanying drawings, and the appended claims.

DESCRIPTION OF REFERENCE NUMERALS

Figure 1:
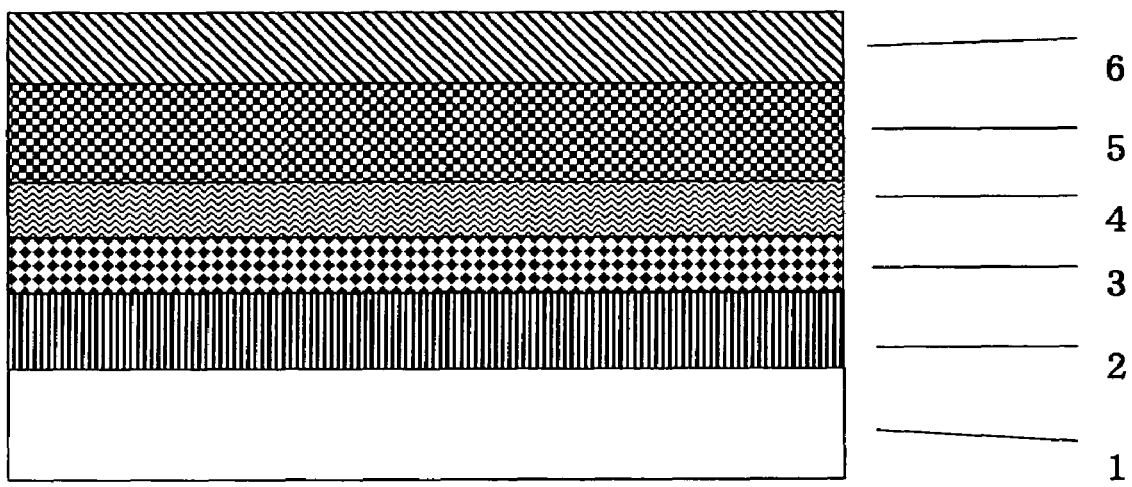
FIG. 1 is a diagrammatic view showing the laminate structure of the transfer foil C produced in Example 1.

1: Polyethylene terephthalate film (provisional substrate)
2: Release layer
3: Low refraction layer (antireflection film)
4: High refraction layer having an antistatic effect
5: Hard coat layer
6: Adhesive layer
7: Polymethyl methacrylate plate (optical substrate)
8: Fluorine-containing surfactant layer
9: Polyethylene terephthalate film (optical substrate)
10: Ultraviolet-curable resin layer

DETAILED DESCRIPTION OF THE INVENTION

In one aspect of the present invention, there is provided an antireflection film comprising silica particles and at least one binder compound, wherein the silica particles are bound together through the at least one binder compound, the antireflection film having the following characteristics (a) to (c):

(a) a silica particle content of 30% by weight or more, based on the weight of the antireflection film, (b) an arithmetic mean surface roughness (Ra) of not more than 2 nm, and (c) a silicon atom content of 10 atom % or more, as measured by X-ray photoelectron spectroscopy (XPS) with respect to the surface of the antireflection film.

For an easy understanding of the present invention, the essential features and various preferred embodiments of the present invention are enumerated below.

1. An antireflection film comprising silica particles and at least one binder compound, wherein the silica particles are bound together through the at least one binder compound, the antireflection film having the following characteristics (a) to (c):

(a) a silica particle content of 30% by weight or more, based on the weight of the antireflection film, (b) an arithmetic mean surface roughness (Ra) of not more than 2 nm, and (c) a silicon atom content of 10 atom % or more, as measured by X-ray photoelectron spectroscopy (XPS) with respect to the surface of the antireflection film.

2. The antireflection film according to item 1 above, wherein the at least one binder compound is a polymer having functional groups, and wherein the silica particles are covalently bonded to the functional groups of the polymer.

3. The antireflection film according to item 2 above, wherein the molar ratio of the functional groups of the polymer to the silicon atoms present in the silica particles is from 0.01 to 5.

4. The antireflection film according to any one of items 1 to 3 above, wherein the silica particles comprise at least one stringy silica particle selected from the group consisting of a moniliform silica string and a fibrous silica particle.

5. The antireflection film according to item 4 above, wherein the at least one stringy silica particle is present in an amount of 50% by weight or less, based on the weight of the antireflection film.

6. The antireflection film according to any one of items 1 to 5 above, which is porous and has a porosity of from 3 to 50% by volume.

7. An antireflection laminate film comprising a high refraction film and, laminated thereon directly or indirectly, the antireflection film of any one of items 1 to 6 above, wherein the high refraction film has a refractive index higher than the refractive index of the antireflection film.

8. The antireflection laminate film according to item 7 above, wherein the high refraction film comprises:

particles of at least one metal oxide comprising at least one metal selected from the group consisting of titanium, zirconium, zinc, cerium, tantalum, yttrium, hafnium, aluminum, magnesium, indium, tin, molybdenum, antimony and gallium, and at least one binder compound, wherein the particles of at least one metal oxide are bound together through the at least one binder compound.

9. An optical part comprising an optical substrate and, laminated thereon, the antireflection film of any one of items 1 to 6 above.

10. The optical part according to item 9 above, wherein the optical substrate is a transparent resin substrate.

11. The optical part according to item 9 above or 10, which has a minimum reflectance of not more than 2% within the visible light range.

12. The optical part according to any one of items 9 to 11 above, which has a pencil hardness of 2H or more.

13. The optical part according to any one of items 9 to 12 above, which is obtained by a method comprising:

(1) forming the antireflection film of any one of items 1 to 6 above on a provisional substrate having releasability with respect to the antireflection film, to thereby obtain a laminate (i);

(2) laminating an optical substrate on the antireflection film of the laminate (i) to obtain a laminate (ii); and (3) delaminating the provisional substrate from the laminate (ii) to obtain an optical part.

14. An optical part comprising an optical substrate and, laminated thereon, the antireflection laminate film of item 7 or 8 above.

15. The optical part according to item 14 above, wherein the optical substrate is a transparent resin substrate.

16. The optical part according to item 14 or 15 above, which has a minimum reflectance of not more than 2% within the visible light range.

17. The optical part according to any one of items 14 to 16 above, which has a pencil hardness of 2H or more.

18. The optical part according to any one of items 14 to 17 above, which is obtained by a method comprising:

(1) forming the antireflection film of any one of items 1 to 6 above on a provisional substrate having releasability with respect to the antireflection film, to thereby obtain a laminate (I);

(2) laminating a high refraction film on the antireflection film of the laminate (I) to obtain a laminate (II);

(3) laminating an optical substrate on the high refraction film of the laminate (II) to obtain a laminate (III); and (4) delaminating the provisional substrate from the laminate (III) to obtain an optical part.

Hereinbelow, the present invention is described in detail.

The antireflection film of the present invention comprises silica particles and at least one binder compound, wherein the silica particles are bound together through the at least one binder compound.

In the present invention, the thickness of the antireflection film is generally from 50 to 1,000 nm, preferably from 50 to 500 nm, more preferably from 60 to 200 nm. When the antireflection film has a thickness of less than 50 nm or more than 1,000 nm, the antireflection effect on light in the visible light range may be lowered.

In the present invention, it is necessary that the antireflection film have a silica particle content of 30% by weight or more, preferably from 30 to 95% by weight, more preferably from 40 to 90% by weight, still more preferably from 50 to 80% by weight. By virtue of the silica particle content of 30% by weight or more, it becomes possible to obtain an antireflection film having a satisfactory strength. Further, in some cases, the silica particle content of 30% by weight or more provides a further advantage in that the refractive index of the antireflection film can be further lowered by the presence of microvoids formed between mutually adjacent silica particles. When the silica particle content is less than 30% by weight, problems are likely to be caused not only in that the strength of the antireflection film becomes unsatisfactory, but also in that mechanical properties (such as abrasion resistance) are not satisfactorily improved. On the other hand, when the silica particle content is more than 95% by weight, problems are likely to be caused in that mechanical properties (such as abrasion resistance) are not satisfactorily improved.

In the present invention, preferred examples of methods for measuring the silica particle content of the antireflection film include a method in which an antireflection film is analyzed by X-ray photoelectron spectroscopy (XPS) while scraping the antireflection film by sputtering.

With respect to the shape of the silica particles used in the antireflection film, there is no particular limitation, and there can be used any of spherical silica particles, plate-shaped silica particles, needle-shaped silica particles, stringy silica particles and botryoidal silica particles.

The term "stringy silica particles" means strings of silica (hereinafter referred to as moniliform silica strings) in which a plurality of silica particles (such as spherical silica particles, plate-shaped silica particles and needle-shaped silica particles) are linked in rosary form, short-fibrous silica particles disclosed in Unexamined Japanese Patent Application Laid-Open Specification No. 2001-188104, or the like. These stringy silica particles may be used individually or in combination. Further, these stringy silica particles may be linear or branched.

Further, the term "botryoidal silica particles" means a botryoidal coalescent cluster of a plurality of silica particles (such as spherical silica particles, plate-shaped silica particles, needle-shaped silica particles or the like).

In the present invention, the term "spherical silica particle" means a silica particle in which the ratio of the longest diameter (major axis) of the particle to the shortest diameter (minor diameter) as measured in a direction perpendicular to the longest diameter is less than 1.5. Silica particles which do not satisfy the above-mentioned ratio are regarded as non-spherical silica particles. The shape of silica particles can be confirmed by, for example, observation using a transmission electron microscope.

In the present invention, it is preferred to use non-spherical silica particles (i.e., plate-shaped silica particles, needle-shaped silica particles, stringy silica particles, botryoidal silica particles or the like) because microvoids are more likely to be formed between mutually adjacent non-spherical silica particles, thereby lowering the refractive index of the antireflection film.

When spherical silica particles, plate-shaped silica particles or needle-shaped silica particles are used, it is preferred that the average particle diameter is within the range of from 10 to 200 nm. The term "average particle diameter" means a value obtained by the following formula:

average particle diameter (unit: nm)=(2,720/specific surface area), wherein the specific surface area ($m^2$/g) is measured by a conventional nitrogen adsorption method (BET method) (see Unexamined Japanese Patent Application Laid-Open Specification No. Hei 1-317115). When the average particle diameter of the silica particles is less than 10 nm, there is a possibility that it becomes difficult to obtain an antireflection film having satisfactory strength. On the other hand, when the average particle diameter of the silica particles is more than 200 nm, there is a possibility that the arithmetic mean surface roughness (Ra) of the antireflection film becomes large, so that haze tends to occur and the resolution of an image which is observed through the antireflection film tends to be lowered.

When the stringy silica particles are used, it is especially preferred to use moniliform silica strings having an average length of from 30 to 200 nm, wherein each moniliform silica string comprises silica particles (such as spherical silica particles, plate-shaped silica particles, and needle-shaped silica particles) having an average particle diameter of from 5 to 30 nm, more advantageously from 10 to 30 nm, the silica particles being linked in rosary form. The term "average length" means a value as measured by the dynamic light scattering method. The average length can be measured by, for example, a dynamic light scattering method described in "Journal of Chemical Physics", Vol. 57, No.11, p. 4,814 (1972).

When the average particle diameter of the silica particles constituting the moniliform silica strings is less than 10 nm, there is a possibility that it becomes difficult to obtain an antireflection film having satisfactory strength. On the other hand, when the average particle diameter of the silica particles constituting the moniliform silica strings is more than 30 nm, there is a possibility that the arithmetic mean surface roughness (Ra) of the antireflection film becomes large, so that haze tends to occur and the resolution of an image which is observed through the antireflection film tends to be lowered, thus lowering the visibility of the image. Further, when the average length of the moniliform silica strings is less than 30 nm, there is a possibility that it becomes difficult to obtain an antireflection film having satisfactory strength. On the other hand, when the average length of the moniliform silica strings is more than 200 nm, there is also a possibility that the arithmetic mean surface roughness (Ra) of the antireflection film becomes large, so that haze tends to occur and the resolution (i.e., definition) of an image which is observed through the antireflection film tends to be lowered, thus lowering the visibility of the image.

In the present invention, the use of the stringy silica particles is preferred in that the strength of the antireflection film can be improved. Specifically, the use of the stringy silica particles is advantageous in that it becomes easy to cause the silica particles to be present at a position near the surface of the antireflection film, in that the silica particles become less likely to come off from the surface of the antireflection film, and in that the number of points at which silica particles are in contact and linked with each other becomes large. As stringy silica particles, the moniliform silica strings are especially preferred, and it is most preferred to use a moniliform silica string having a two-dimensionally or three-dimensionally curved form. Specific examples of moniliform silica strings include Snowtex® OUP, Snowtex® UP, Snowtex® PS-S, Snowtex® PS-SO, Snowtex® PS-M, Snowtex® PS-MO (each manufactured and sold by Nissan Chemical Industries, Ltd., Japan), and Fine Cataloid F-120 (manufactured and sold by Catalysts & Chemicals Industries, Ltd., Japan). These moniliform silica strings have a dense skeleton of silica, and have a three-dimensionally curved form, and, thus, are especially preferred in the present invention.

In the present invention, when stringy silica particles are used, there is no particular limitation with respect to the content of stringy silica particles in the antireflection film. When the content of stringy silica particles in the antireflection film is relatively large, the volume of the voids formed in the antireflection film becomes large, so that the refractive index of the antireflection film can be reduced. On the other hand, when the content of stringy silica particles in the antireflection film is relatively small, the unevenness of the surface of the antireflection film is lowered, so that the arithmetic mean surface roughness (Ra) of the antireflection film can be reduced. The content of stringy silica particles in the antireflection film is preferably from 1 to 90% by weight, more preferably from 10 to 70% by weight, still more preferably from 20 to 50% by weight. When the content of the silica strings in the antireflection film is more than 90% by weight, the arithmetic mean surface roughness (Ra) may become more than 2 nm.

Further, when the stringy silica particles are used in combination with silica particles other than stringy silica particles, there is no particular limitation with respect to the weight ratio of stringy silica particles to silica particles other than stringy silica. However, it is preferred that the weight ratio of stringy silica particles to silica particles other than stringy silica particles is within the range of from 0.01 to 100, more advantageously from 0.1 to 10, still more advantageously from 0.3 to 3.

The antireflection film of the present invention comprises the silica particles and at least one binder compound, wherein the silica particles are bound together through the at least one binder compound.

As a binder compound, there can be used either of a binder compound which forms a chemical bond with silica particles and a binder compound which does not form a chemical bond with silica particles. However, preferred is a binder compound which forms a chemical bond with silica particles. Examples of preferred binder compounds are as follows.

(1) Hydrolysable silanes, such as tetramethoxysilane, tetraethoxysilane, tetra(n-propoxy)silane, tetra(i-propoxy)silane, tetra(n-butoxy)silane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane, allyltriethoxysilane, methyltri(n-propoxy)silane, methyltri(iso-propoxy)silane, methyltri(n-butoxy)silane, methyltri(sec-butoxy)silane, methyltri(tert-butoxy)silane, ethyltri(n-propoxy)silane, ethyltri(iso-propoxy)silane, ethyltri(n-butoxy)silane, ethyltri(sec-butoxy)silane, ethyltri(tert-butoxy)silane, n-propyltri(n-propoxy)silane, n-propyltri(iso-propoxy)silane, n-propyltri(n-butoxy)silane, n-propyltri(sec-butoxy)silane, n-propyltri(tert-butoxy)silane, i-propyltrimethoxysilane, i-propyltriethoxysilane, i-propyltri(n-propoxy)silane, i-propyltri(iso-propoxy)silane, i-propyltri(n-butoxy)silane, i-propyltri(sec-butoxy)silane, i-propyltri(tert-butoxy)silane, n-butyltrimethoxysilane, n-butyltriethoxysilane, n-butyltri(n-propoxy)silane, n-butyltri(iso-propoxy)silane, n-butyltri(n-butoxy)silane, n-butyltri(sec-butoxy)silane, n-butyltri(tert-butoxy)silane, n-butyltriphenoxysilane, sec-butyltrimethoxysilane, sec-butyltri(n-propoxy)silane, sec-butyltri(iso-propoxy)silane, sec-butyltri(n-propoxy)silane, sec-butyltri(sec-propoxy)silane, sec-butyltri(tert-butoxy)silane, t-butyltrimethoxysilane, t-butyltriethoxysilane, t-butyltri(n-propoxy)silane, t-butyltri(iso-propoxy)silane, t-butyltri(n-butoxy)silane, t-butyltri(sec-butoxy)silane, t-butyltri(tert-butoxy)silane, phenyltri(n-propoxy)silane, phenyltri(iso-propoxy)silane, phenyltri(n-butoxysilane), phenyltri(sec-butoxy)silane, phenyltri(tert-butoxy)silane, dimethoxysilane, diethoxysilane, methyldimethoxysilane, methyldiethoxysilane, dimethyldimethoxysilane, dimethyldiethoxysilane, dimethyldi(n-propoxy)silane, dimethyldi(i-propoxy)silane, dimethyldi(n-butoxy)silane, dimethyldi(sec-butoxy)silane, dimethyldi(tert-butoxy)silane, diethyldimethoxysilane, diethyldiethoxysilane, diethyldi(n-propoxy)silane, diethyldi(i-proposy)silane, diethyldi(n-butoxy)silane, diethyldi(sec-butoxy)silane, diethyldi(tert-butoxy)silane, diphenyldimethoxysilane, diphenyldiethoxysilane, diphenyldi(n-propoxy)silane, diphenyldi(i-propoxy)silane, diphenyldi(n-butoxy)silane, diphenyldi(sec-butoxy)silane, diphenyldi(tert-butoxy)silane, methylethyldimethoxysilane, methylethyldiethoxysilane, methylethyldi(n-propoxy)silane, methylethyldi(i-propoxy)silane, mehtylethyldi(n-butoxy)silane, methylethyldi(sec-butoxy)silane, methylethyldi(tert-butoxy)silane, methylpropyldimethoxysilane, methylpropyldiethoxysilane, methylpropyldi(n-propoxy)silane, methylpropyldi(i-propoxy)silane, methylpropyldi(n-butoxy)silane, methylpropyldi(sec-butoxy)silane, methylpropyldi(tert-butoxy)silane, methylphenyldimethoxysilane, methylphenyldiethoxysilane, methylphenyldi(n-propoxy)silane, methylphenyldi(i-propoxy)silane, methylphenyldi(n-butoxy)silane, methylphenyldi(sec-butoxy)silane, methylphenyldi(tert-butoxy)silane, ethylphenyldimethoxysilane, ethylphenyldiethoxysilane, ethylphenyldi(n-propoxy)silane, ethylphenyldi(i-propoxy)silane, ethylphenyldi(n-butoxy)silane, ethylphenyldi(sec-butoxy)silane, ethylphenyldi(tert-butoxy)silane, methylvinyldimethoxysilane, methylvinyldiethoxysilane, methylvinyldi(n-propoxy)silane, methylvinyldi(i-propoxy)silane, methylvinyldi(n-butoxy)silane, methylvinyldi(sec-butoxy)silane, methylvinyldi(tert-butoxy)silane, divinyldimethoxysilane, divinyldiethoxysilane, divinyldi(n-propoxy)silane, divinyldi(i-propoxy)silane, divinyldi(n-butoxy)silane, divinyldi(sec-butoxy)silane, divinyldi(tert-butoxy)silane, methoxysilane, ethoxysilane, methylmethoxysilane, methylethoxysilane, dimethylmethoxysilane, dimethylethoxysilane, trimethylmethoxysilane, trimethylethoxysilane, trimethyl(n-propoxy)silane, trimethyl(i-propoxy)silane, trimethyl(n-butoxy)silane, trimethyl(sec-butoxy)silane, trimethyl(tert-butoxy)silane, triethylmethoxysilane, triethylethoxysilane, triethyl(n-propoxy)silane, triethyl(i-propoxy)silane, triethyl(n-butoxy)silane, triethyl(sec-butoxy)silane, triethyl(tert-butoxy)silane, tripropylmethoxysilane, tripropylethoxysilane, tripropyl(n-propoxy)silane, tripropyl(i-propoxy)silane, tripropyl(n-butoxy)silane, tripropyl(sec-butoxy)silane, tripropyl(tert-butoxy)silane, triphenylmethoxysilane, triphenylethoxysilane, triphenyl(n-propoxy)silane, triphenyl(i-propoxy)silane, triphenyl(n-butoxy)silane, triphenyl(sec-butoxy)silane, triphenyl(tert-butoxy)silane, methyldiethylmethoxysilane, methyldiethylethoxysilane, methyldiethyl(n-propoxy)silane, methyldiethyl(i-propoxy)silane, methyldiethyl(n-butoxy)silane, methyldiethyl(sec-butoxy)silane, methyldiethyl(tert-butoxy)silane, methyldipropylmethoxysilane, methyldipropylethoxysilane, methyldipropyl(n-propoxy)silane, methyldipropyl(i-propoxy)silane, methyldipropyl(n-butoxy)silane, methyldipropyl(sec-butoxy)silane, methyldipropyl(tert-butoxy)silane, methyldiphenylmethoxysilane, methyldiphenylethoxysilane, methyldiphenyl(n-propoxy)silane, methyldiphenyl(i-propoxy)silane, methyldiphenyl(n-butoxy)silane, methyldiphenyl(sec-butoxy)silane, methyldiphenyl(tert-butoxy)silane, ethyldimethylmethoxysilane, ethyldimethylethoxysilane, ethyldimethyl(n-propoxy)silane, ethyldimethyl(i-propoxy)silane, ethyldimethyl(n-butoxy)silane, ethyldimethyl(sec-butoxy)silane, ethyldimethyl(tert-butoxy)silane, ethyldipropylmethoxysilane, ethyldipropylethoxysilane, ethyldipropyl(n-propoxy)silane, ethyldipropyl(i-propoxy)silane, ethyldipropyl(n-butoxy)silane, ethyldipropyl(sec-butoxy)silane, ethyldipropyl(tert-butoxy)silane, ethyldiphenylmethoxysilane, ethyldiphenylethoxysilane, ethyldiphenyl(n-propoxy)silane, ethyldiphenyl(i-propoxy)silane, ethyldiphenyl(n-butoxy)silane, ethyldiphenyl(sec-butoxy)silane, ethyldiphenyl(tert-butoxy)silane, propyldimethylmethoxysilane, propyldimethylethoxysilane, propyldimethyl(n-propoxy)silane, propyldimethyl(i-propoxy)silane, propyldimethyl(n-butoxy)silane, propyldimethyl(sec-butoxy)silane, propyldimethyl (tert-butoxy)silane, propyldiethylmethoxysilane, propyldiethylethoxysilane, propyldiethyl(n-propoxy)silane, propyldiethyl(i-propoxy)silane, propyldiethyl(n-butoxy)silane, propyldiethyl(sec-butoxy)silane, propyldiethyl(tert-butoxy)silane, propyldiphenylmethoxysilane, propyldiphenylethoxysilane, propyldiphenyl(n-propoxy)silane, propyldiphenyl(i-propoxy)silane, propyldiphenyl(n-butoxy)silane, propyldiphenyl(sec-butoxy)silane, propyldiphenyl(tert-butoxy)silane, phenyldimethylmethoxysilane, phenyldimethylethoxysilane, phenyldimethyl(n-propoxy)silane, phenyldimethyl(i-propoxy)silane, phenyldimethyl(n-butoxy)silane, phenyldimethyl(sec-butoxy)silane, phenyldimethyl(tert-butoxy)silane, phenyldiethylmethoxysilane, phenyldiethylethoxysilane, phenyldiethyl(n-propoxy)silane, phenyldiethyl(i-propoxy)silane, phenyldiethyl(n-butoxy)silane, phenyldiethyl(sec-butoxy)silane, phenyldiethyl(tert-butoxy)silane, phenyldipropylmethoxysilane, phenyldipropylethoxysilane, phenyldipropyl(n-propoxy)silane, phenyldipropyl(i-propoxy)silane, phenyldipropyl(n-butoxy)silane, phenyldipropyl (sec-butoxy)silane, phenyldipropyl(tert-butoxy)silane, trivinylmethoxysilane, trivinylethoxysilane, trivinyl(n-propoxy)silane, trivinyl(i-propoxy)silane, trivinyl (n-butoxy)silane, trivinyl(sec-butoxy)silane, trivinyl(tert-butoxy)silane, vinyldimethylmethoxysilane, vinyldimethylethoxysilane, vinyldimethyl (n-propoxy)silane, vinyldimethyl(i-propoxy)silane, vinyldimethyl(n-butoxy)silane, vinyldimethyl(sec-butoxy)silane, vinyldimethyl(tert-butoxy)silane, vinyldiethylmethoxysilane, vinyldiethylethoxysilane, vinyldiethyl (n-propoxy)silane, vinyldiethyl(i-propoxy)silane, vinyldiethyl(n-butoxy)silane, vinyldiethyl(sec-butoxy)silane, vinyldiethyl(tert-butoxy)silane, vinyldipropylmethoxysilane, vinyldipropylethoxysilane, vinyldipropyl (n-propoxy)silane, vinyldipropyl(i-propoxy)silane, vinyldipropyl(n-butoxy)silane, vinyldipropyl(sec-butoxy) silane, vinyldipropyl(tert-butoxy)silane, bis(trimethoxysilyl)methane, bis(triethoxysilyl)methane, bis(triphenoxysilyl)methane, bis(trimethoxysilyl)ethane, bis(triethoxysilyl)ethane, bis(triphenoxysilyl)ethane, 1,3-bis(trimethoxysilyl)propane, 1,3-bis (triethoxysilyl)propane, 1,3-bis(triphenoxysilyl)propane, 1,4-bis(trimethoxysilyl) benzene, 1,4-bis(triethoxysilyl)benzene, hexamethoxydisiloxane, hexaethoxydisiloxane, hexaphenoxydisiloxane, 1,1,1,3,3-pentamethoxy-3-methyldisiloxane, 1,1,1,3,3-pentaethoxy-3-methyldisiloxane, 1,1,1,3,3-pentamethoxy-3-phenyldisiloxane, 1,1,1,3,3-pentaethoxy-3-phenyldisiloxane, 1,1,3,3-tetramethoxy-1,3-dimethyldisiloxane, 1,1,3,3-tetraethoxy-1,3-dimethyldisiloxane, 1,1,3,3-tetramethoxy-1,3-diphenyldisiloxane, 1,1,3,3-tetraethoxy-1,3-diphenyldisiloxane, 1,1,3-trimethoxy-1,3,3-trimethyldisiloxane, 1,1,3-triethoxy-1,3,3-trimethyldisiloxane, 1,1,3-trimethoxy-1,3,3-triphenyldisiloxane, 1,1,3-triethoxy-1,3,3-triphenyldisiloxane, 1,3-dimethoxy-1,1,3,3-tetramethyldisiloxane, 1,3-diethoxy-1,1,3,3-tetramethyldisiloxane, 1,3-dimethoxy-1,1,3,3-tetraphenyldisiloxane, 1,3-diethoxy-1,1,3,3-tetraphenyldisiloxane, 1,3-dimethoxy 1,1,3,3-tetramethyldisiloxane, 1,3-diethoxy-1,1,3,3-tetramethyldisiloxane, 1,3-dimethoxy-1,1,3,3-tetraphenyldisiloxane, 1,3-diethoxy-1,1,3,3-tetraphenyldisiloxane, 3-chloropropyltrimethoxysilane, 3-chloropropyltriethoxysilane, 3-hydroxypropyltrimethoxysilane, 3-hydroxypropyltriethoxysilane, 3-mercaptopropyltrimethoxysilane, 3-mercaptopropyltriethoxysilane, trifluoropropyltrimethoxysilane, trifluoropropyltriethoxysilane, 3-aminopropyltriethoxysilane, 3-aminopropyltrimethoxysilane, N-(2-aminoethyl)-3-aminopropyltriethoxysilane, N-(2-aminoethyl)-3-aminopropyltrimethoxysilane, tetraacetoxysilane, tetrakis(trichloroacetoxy)silane, tetrakis(trifluoroacetoxy)silane, triacetoxysilane, tris(trichloroacetoxy)silane, tris(trifluoroacetoxy)silane, methyltriacetoxysilane, methyltris(trichloroacetoxy)silane, methyltris(trifluoroacetoxy)silane, phenyltriacetoxysilane, phenyltris(trichloroacetoxy)silane, phenyltris(trifluoroacetoxy)silane, methyldiacetoxysilane, methylbis(trichloroacetoxy)silane, methylbis(trifluoroacetoxy)silane, phenyldiacetoxysilane, phenylbis(trichloroacetoxy)silane, phenylbis(trifluoroacetoxy)silane, dimethyldiacetoxysilane, dimethylbis(trichloroacetoxy)silane, dimethylbis(trifluoroacetoxy)silane, methylphenyldiacetoxysilane, methylphenylbis(trichloroacetoxy)silane, methylphenylbis(trifluoroacetoxy)silane, diphenyldiacetoxysilane, diphenylbis(trichloroacetoxy)silane, diphenylbis(trifluoroacetoxy)silane, methylacetoxysilane, methyl(trichloroacetoxy)silane, methyl(trifluoroacetoxy)silane, phenylacetoxysilane, phenyl(trichloroacetoxy)silane, phenyl (trifluoroacetoxy)silane, dimethylacetoxysilane, dimethyl (trichloroacetoxy)silane, dimethyl(trifluoroacetoxy) silane, diphenylacetoxysilane, diphenyl(trichloroacetoxy) silane, diphenyl(trifluoroacetoxy)silane, trimethylacetoxysilane, trimethyl(trichloroacetoxy)silane, trimethyl(trifluoroacetoxy)silane, triphenylacetoxysilane, triphenyl(trichloroacetoxy)silane, triphenyl(trifluoroacetoxy)silane, tetrachlorosilane, tetrabromosilane, tetrafluorosilane, trichlorosilane, tribromosilane, trifluorosilane, methyltrichlorosilane, methyltribromosilane, methyltrifluorosilane, phenyltrichlorosilane, phenyltribromosilane, phenyltrifluorosilane, methyldichlorosilane, methyldibromosilane, methyldifluorosilane, phenyldichlorosilane, phenyldibromosilane, phenyldifluorosilane, dimethyldichlorosilane, dimethyldibromosilane, dimethyldifluorosilane, methylphenyldichlorosilane, methylphenyldibromosilane, methylphenyldifluorosilane, diphenyldichlorosilane, diphenyldibromosilane, diphenyldifluorosilane, methylchlorosilane, methylbromosilane, methylfluorosilane, phenylchlorosilane, phenylbromosilane, phenylfluoro-silane, dimethylchlorosilane, dimethylbromosilane, dimethylfluorosilane, diphenylchlorosilane, diphenylbromosilane, diphenylfluorosilane, trimethylchlorosilane, trimethylbromosilane, trimethylfluorosilane, triphenylchlorosilane, triphenylbromosilane and triphenylfluorosilane; or a partial hydrolysis product and/or a dehydration-condensation product of any of the above-mentioned compounds (wherein when any one of these compounds exemplified in this item (1) is used as a binder compound, it is preferred that the binder compound is three-dimensionally cross-linked through siloxane linkages in the antireflection film).

(2) Hydrolyzable silanes having, in a molecule thereof, a polymerizable functional group and a functional group capable of forming a covalent bond with silica particles, such as 3-glycidoxypropyltrimethoxysilane, 3-glycidoxypropyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-acryloxypropyltriacetoxysilane, 3-acryloxypropyltris(trichloroacetoxy)silane, 3-acryloxypropyltris(trifluoroacetoxy)silane, 3-methacryloxypropyltriacetoxysilane, 3-methacryloxypropyltris(trichloroacetoxy)silane, 3-methacryloxypropyltris(trifluoroacetoxy)silane, 3-glycidoxypropyltriacetoxysilane, 3-glycidoxypropyltris(trichloroacetoxy)silane, 3-glycidoxypropyltris(trifluoroacetoxy)silane, 3-acryloxypropyltrichlorosilane, 3-acryloxypropyltribromosilane, 3-acryloxypropyltrifluorosilane, 3-methacryloxypropyltrichlorosilane, 3-methacryloxypropyltribromosilane, 3-methacryloxypropyltrifluorosilane, 3-glycidoxypropyltrichlorosilane, 3-glycidoxypropyltribromosilane, 3-glycidoxypropyltrifluorosilane, 3-glycidoxypropylmethyldimethoxysilane, 3-glycidoxypropylmethyldiethoxysilane, 3-glycidoxypropyldimethylmethoxysilane, 3-glycidoxypropyldimethylethoxysilane, 3-methacryloxypropylmethyldimethoxysilane, 3-methacryloxypropylmethyldiethoxysilane, 3-methacryloxypropyldimethylmethoxysilane, 3-methacryloxypropyldimethylethoxysilane, 3-methacryloxypropyltris(methoxyethoxy)silane, 3-methacryloxypropylmethyldichlorosilane, 3-methacryloxypropyldimethylchlorosilane, 3-methacryloxypropylsilatrane, 3-methacryloxypropyltripropoxysilane, O-methacryloxyethyl-N-triethoxysilylpropylurethane, N-(3-methacryloxy-2-hydroxypropyl)-3-aminopropyltrietoxysilane, 3-mercaptopropyltrimetoxysilane, 3-mercaptopropyltrietoxysilane, 3-mercaptopropylmethyldimethoxysilane, 3-mercaptopropylmethyldiethoxysilane, 3-mercaptopropyldimethylmethoxysilane and 3-mercaptopropyldimethylethoxysilane; or a partial hydrolysis product and/or a dehydration-condensation product of any of the above-mentioned compounds (wherein when any one of these compounds exemplified in this item (2) is used as a binder compound, it is preferred that the binder compound is three-dimensionally cross-linked through siloxane linkages or the polymerizable functional group of the binder compound is polymerized in the antireflection film, more advantageously not only is the binder compound three-dimensionally cross-linked through siloxane linkages in the antireflection film, but also the polymerizable functional group of the binder compound is polymerized in the antireflection film).

(3) Silanol group-containing silicon compounds, such as silicic acid, trimethylsilanol, triphenylsilanol, dimethylsilanediol diphenylsilanediol, silanol-terminated polydimethylsiloxane, silanol-terminated polydiphenylsiloxane, silanol-terminated polymethylphenylsiloxane, silanol-terminated polymethyl ladder siloxane, silanol-terminated polyphenyl ladder siloxane and octahydroxyoctasilsesquioxane (wherein when any one of these compounds exemplified in this item (3) is used as a binder compound, it is preferred that the binder compound is three-dimensionally cross-linked through siloxane linkages in the antireflection film).

(4) Activated silica, which can be obtained by contacting the below-mentioned silicates with an acid or an ion exchange resin: water glass, sodium orthosilicate, potassium orthosilicate, lithium orthosilicate, sodium metasilicate, potassium metasilicate, lithium metasilicate, tetramethylammonium orthosilicate, tetrapropylammonium orthosilicate, tetramethylammonium metasilicate, tetrapropylammonium metasilicate and the like (wherein when any one of these compounds exemplified in this item (4) is used as a binder compound, it is preferred that the binder compound is three-dimensionally cross-linked through siloxane linkages in the antireflection film).

(5) Organic polymers, such as polyethers (e.g., polyethylene glycol, polypropylene glycol and polytetramethylene glycol), amides (e.g., a polyacrylamide derivative, a polymethacrylamide derivative, poly(N-vinylpyrrolidone) and poly(N-acylethyleneimene)), esters (e.g., a polyvinyl alcohol, a polyvinyl acetate, a polyacrylic acid derivative, a polymethacrylic acid derivative and polycaprolactone), polyimides, polyurethanes, polyureas and polycarbonates (wherein when these organic polymers have a polymerizable functional group at a terminal thereof or in the main chain thereof, it is preferred that the polymerizable functional group is polymerized in the antireflection film).

(6) Polymerizable monomers, such as alkyl(meth)acrylate, alkylene bis(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, alkylene bisglycidyl ether, trimethylolpropane triglycidyl ether, pentaerythritol triglycidyl ether, pentaerythritol tetraglycidyl ether and vinylcyclohexene diepoxide (the term "(meth)acrylate" means both an acrylate and a methacrylate) (wherein when any one of these compounds exemplified in this item (6) is used as a binder compound, it is preferred that the binder compound is cured in the antireflection film).

(7) Conventional curable resins, such as a (meth)acrylic UV-curable resin, a moisture-curable silicone resin, a heat-curable silicone resin, an epoxy resin, a phenoxy resin, a novolac resin, a silicone acrylate resin, a melamine resin, a phenol resin, an unsaturated polyester resin, a polyimide resin, a urethane resin and a urea resin (wherein when any one of these compounds exemplified in this item (7) is used as a binder compound, it is preferred that the binder compound is three-dimensionally cross-linked through siloxane linkages or that the polymerizable functional group of the binder compound is polymerized in the antireflection film).

The above-exemplified binder compounds may be used individually or in combination. Among these binder compounds, especially preferred are those exemplified in item (2) above, i.e., hydrolysable silanes having, in a molecule thereof, a polymerizable functional group and a functional group capable of forming a covalent bond with silica particles. Further, among the organic polymers exemplified in item (5) above, those which have a polymerizable functional group at a terminal thereof or in the main chain thereof can be preferably used in combination with a polymerizable monomer (exemplified in item (6) above). Especially when a compound exemplified in item (2) above is used as a binder compound, the binder compound is not only present as a polymer in the antireflection film, but also forms covalent bonds with silica particles, thereby rendering it possible to obtain an antireflection film having more excellent mechanical properties. Even when a binder compound which does not form covalent bonds with silica particles is used, the binder compound bonds to silica particles by an intermolecular force, or through a hydrogen bond, an ionic bond or the like.

The weight ratio of the binder compound to silica particles is from 0.01 to 20, preferably from 0.1 to 10, more preferably from 0.2 to 5, still more preferably from 0.3 to 2.

Among the above-exemplified binder compounds, especially preferred are those exemplified in item (2) above, i.e., hydrolysable silanes having, in a molecule thereof, a polymerizable functional group and a functional group capable of forming a covalent bond with silica particles, or a partial hydrolysis product and/or a dehydration-condensation product thereof. The reasons why these binder compounds exemplified in item (2) are preferred are that by the use of these binder compounds, silica particles are easily dispersed uniformly, thereby reducing the arithmetic mean surface roughness (Ra) of the antireflection film, and that it becomes easier to cause silica particles to be present at a position near the surface of the antireflection film. With respect to the content of such a binder compound, the molar ratio of the functional groups capable of forming covalent bonds with silica particles to the silicon atoms present in the silica particles in the antireflection film is from 0.01 to 5, preferably from 0.05 to 3, still more preferably from 0.1 to 1. With respect to counting the number of the functional groups capable of forming covalent bonds with silica particles, for example, any one of a trimethoxysilyl group, a methyldimethoxysilyl group and a dimethylmethoxysilyl group is counted as one group. The same principle also applies to silyl groups having an ethoxyl group(s), an acetyl group(s), a chloro group(s) or the like.

The antireflection film of the present invention is obtained by dispersing, in a dispersion medium, the above-mentioned silica particles, at least one binder compound and, optionally, an additive, and coating the resultant dispersion onto an optical substrate or a provisional substrate mentioned below. With respect to the dispersion medium, there is no particular limitation as long as the silica particles, the binder compound and the additive can be substantially stably dispersed therein.

Specific examples of dispersion media include water; alcohols, such as monohydric $C_1$-$C_6$ alcohols, dihydric $C_1$-$C_6$ alcohols and glycerol; amides, such as formamide, N-methylformamide, N-ethylformamide, N,N-dimethylformamide, N,N-diethylformamide, N-methylacetamide, N-ethylacetamide, N,N-dimethylacetamide, N,N-diethylacetamide and N-methylpyrrolidone; ethers, such as tetrahydrofuran, diethyl ether, di(n-propyl)ether, diisopropyl ether, diglyme, 1,4-dioxane, ethylene glycol dimethyl ether, ethylene glycol diethyl ether and propylene glycol dimethyl ether; alkanol ethers, such as ethylene glycol monomethyl ether, propylene glycol monomethyl ether, ethylene glycol monoethyl ether, propylene glycol monoethyl ether, ethylene glycol monopropyl ether, propylene glycol monopropyl ether, ethylene glycol monobutyl ether and propylene glycol monobutyl ether; esters, such as ethyl formate, methyl acetate, ethyl acetate, ethyl lactate, ethylene glycol monomethyl ether acetate, ethylene glycol diacetate, propylene glycol monomethyl ether acetate, diethyl carbonate, ethylene carbonate, propylene carbonate, γ-butyrolactone and ethyl acetoacetate; ketones, such as acetone, methyl ethyl ketone, methyl propyl ketone, methyl(n-butyl)ketone, methyl isobutyl ketone, methyl amyl ketone, acetyl acetone, cyclopentanone and cyclohexanone; nitriles, such as acetonitrile, propionitrile, n-butyronitrile and isobutyronitrile; dimethyl sulfoxide; dimethyl sulfone; and sulfolane.

Preferred examples of dispersion media include monohydric $C_1$-$C_6$ alcohols; alkanol ethers, such as ethylene glycol monomethyl ether, propylene glycol monomethyl ether, ethylene glycol monoethyl ether, propylene glycol monoethyl ether, ethylene glycol monopropyl ether, propylene glycol monopropyl ether, ethylene glycol monobutyl ether and propylene glycol monobutyl ether; and ketones, such as acetone, methyl ethyl ketone, methyl propyl ketone, methyl(n-butyl) ketone, methyl isobutyl ketone, methyl amyl ketone, acetyl acetone, cyclopentanone and cyclohexanone.

These dispersion media may be used in combination, or in mixture with another appropriate solvent or an additive so long as the effects of the present invention are not impaired.

For imparting excellent film-forming ability to the above-mentioned dispersion, it is preferred that the concentration of the silica particles is in the range of from 0.01 to 10% by weight, more advantageously from 0.05 to 5% by weight. When the concentration of the silica particles is less than 0.01% by weight, it becomes difficult to obtain a film having a desired thickness. On the other hand, when the concentration of the silica particles is more than 10% by weight, the viscosity of the dispersion as a coating liquid becomes too high and the film-forming ability is likely to become lowered.

Since the above-mentioned dispersion is coated onto an optical substrate, addition of conventional leveling agents and auxiliary binders (coupling agents) to the dispersion is effective for improving the film-forming ability of the dispersion and increasing the adhesion strength between the final film and the optical substrate.

The binder compound may be coated onto the substrate either by a method in which a binder compound is added to a dispersion containing silica particles (silica particle-containing dispersion) and the resultant dispersion is coated onto a substrate; or by a method in which a binder compound or a solution thereof is coated onto an optical substrate to form a binder compound layer, and then a silica particle-containing dispersion is coated onto the binder compound layer on the substrate. In the latter, the mechanical strength of the final antireflection film can be improved by causing the binder compound to be well mixed into a part or whole of the silica particle layer which is formed on the binder compound layer, and good mixing of the binder compound into the silica particle layer can be achieved by adjusting the viscosity of the binder compound, by appropriately selecting the type of the dispersion medium used for dispersing the silica particles, by adjusting the temperature and time for the heat treatment performed after the coating step, or by performing a pressing treatment. Alternatively, the antireflection film can be formed by a method in which the order of the coating steps is reversed, that is, by a method in which the dispersion containing the silica particles is coated onto a substrate to form a silica particle layer, and then the binder compound or a solution thereof is coated onto the silica particle layer on the optical substrate. Also in this method, it is preferred to cause the binder compound to be well mixed into a part or whole of the silica particle layer which is formed before the coating of the binder compound or a solution thereof, and good mixing of the binder compound into the silica particle layer can be achieved by adjusting the viscosity of the binder compound, by appropriately selecting the type of the dispersion medium used for dispersing the silica particles, by adjusting the temperature and time for the heat treatment performed after the coating step, or by performing a pressing treatment.

Further, even when the binder compound is contained in the silica particle-containing dispersion and, hence, a silica particle layer containing a binder compound is obtained, it is possible to separately apply a binder compound onto the silica particle layer containing a binder compound. For example, there may be performed a procedure in which a silica particle-containing dispersion which also contains a hydrolyzable silane is coated onto a substrate, followed by coating of a (meth)acrylic UV-curable resin.

When the binder compound used is a combination of the polymerizable monomer (6) above with an organic polymer having a polymerizable functional group at a terminal thereof or in the main chain thereof, the latter being selected from the organic polymer (5) above, the type of the polymerizable monomer (6) is appropriately selected in accordance with the form of the reaction, the reaction rate and the like. Also, it is effective to add, as an additive, a polymerization initiator to the binder compound. The polymerization initiator may be selected from conventional polymerization initiators, such as a heat type radical generator, a photo type radical generator, a heat type acid generator and a photo type acid generator, in accordance with the reaction form of the above-mentioned polymerizable functional group or the polymerizable monomer. Specific examples of heat/photo type radical generators include acetophenone type polymerization initiators, benzophenone type polymerization initiators, phosphine oxide type polymerization initiators and titanocene type polymerization initiators, which are represented by commercially available polymerization initiators, such as Irgacure® series and Dalocure® series (both manufactured and sold by Ciba Specialty Chemicals K.K., Japan); thioxanthone type polymerization initiators; diazo type polymerization initiators and O-acyl oxime type polymerization initiators. Among these, especially preferred are Irgacure® 907, Irgacure® 369, Irgacure® 379 and the like which are polymerization initiators having an amino group and/or a morpholino group in the molecule thereof. Specific examples of heat/photo type acid generators include sulfonium type polymerization initiators, iodonium type polymerization initiators and diazomethane type polymerization initiators, which are represented by commercially available polymerization initiators, such as San-Aid™ SI series (manufactured and sold by Sanshin Chemical Industry Co., Ltd., Japan), WPI series and WPGA series (both manufactured and sold by Wako Pure Chemical Industries, Ltd., Japan), and PAGs series (manufactured and sold by SIGMA-ALDRICH Japan, K.K., Japan).

When there is used a binder compound having a polymerizable functional group, such as the hydrolyzable silane compound (2), the polymerizable monomer (6) or an organic polymer (selected from the organic polymer (5) above) having a polymerizable functional group at a terminal or in the main chain thereof, the binder compound may be polymerized in advance so long as the resultant polymer is capable of being dissolved or dispersed in the above-mentioned dispersion medium. Especially in a case where binder compounds having low boiling temperatures are used in combination, when the binder compounds are polymerized in advance, there can be made an easy adjustment of the uniformity of the film thickness during the coating step.

When the hydrolyzable silanes (1) and (2) above are used as the binder compound, these compounds can be used in a monomeric form, but it is preferred that the compounds are used after performing partial hydrolysis/dehydration condensation thereof. The partial hydrolysis/dehydration condensation reaction is performed by reacting the hydrolyzable silanes with water, and a catalyst may be used to catalyze this reaction. Specific examples of such catalysts include acids, such as hydrochloric acid, sulfuric acid, nitric acid, phosphoric acid, boric acid, formic acid and acetic acid; alkalis, such as ammonia, trialkylamine, sodium hydroxide, potassium hydroxide, cholines and tetraalkylammonium hydroxides; and tin compounds, such as dibutyltin dilaurate. Before the hydrolyzable silane is mixed with the silica particles, the former may be subjected to partial hydrolysis/dehydration condensation reaction. Alternatively, the partial hydrolysis/dehydration condensation reaction of the hydrolyzable silane may be performed in the presence of silica particles.

The antireflection film of the present invention may contain various additives, such as an antistatic agent, an ultraviolet absorber, an infrared absorber, a leveling agent, a pigment, a metal salt, a surfactant and a mold release agent. The amount of the additives is selected to be in a range which does not impair the effects of the present invention. It is preferred that the additives are used in an amount of 100% by weight or less, based on the total weight of the silica particles and the binder compound.

With respect to the method for producing the antireflection film of the present invention, there is no particular limitation, and any conventional method for forming a film may be employed so long as the shape of the silica particles, the silica particle content, the concentration of the coating liquid, the type and concentration of the binder compound, and the type and concentration of the additives, and the method and conditions for forming a coating are appropriately selected when the above-mentioned dispersion containing the silica particles and the solution containing the binder compound are applied onto the optical substrate.

The coating of the silica particle-containing dispersion and the binder compound-containing solution on a substrate can be performed by any conventional coating method, such as a dip coating method, a spin coating method, a knife coating method, a bar coating method, a blade coating method, a squeeze coating method, a reverse-roll coating method, a gravure-roll coating method, a slide coating method, a curtain coating method, a spray coating method, a die coating method or a cap coating method. Among these coating methods, it is preferred to use coating methods which can perform continuous coating, such as a knife coating method, a bar coating method, a blade coating method, a squeeze coating method, a reverse-roll coating method, a gravure-roll coating method, a slide coating method, a curtain coating method, a spray coating method, a die coating method and a cap coating method.

After coating the silica particle-containing dispersion and the binder compound-containing solution on a substrate, it is advantageous to subject the resultant coating on the substrate to heating, to thereby volatilize the dispersion medium and perform the condensation and crosslinking of the silica particles and the binder compound. The temperature and time for the heating are determined by the heat resistance of the optical substrate. For example, when a glass substrate is used as the optical substrate, the coating may be heated at 500° C. or higher. On the other hand, when a resin substrate is used as the optical substrate, the heating temperature is generally in the range of from 50 to 200° C., preferably from 80 to 150° C., and the heating time is generally in the range of from 1 second to 1 hour, preferably from 10 seconds to 3 minutes. Further, when the binder compound has radiation-curability, UV irradiation or electron beam irradiation may be performed by conventional methods.

Further, for the purpose of, e.g., smoothing the surface of the antireflection film and imparting stainproofing property to the surface of the antireflection film, an optional overcoat layer may be formed on the antireflection film. The overcoat layer is formed using a conventional material, such as a fluororesin, a moisture-curable silicone resin, a heat-curable silicone resin, silicon dioxide, a (meth)acryl resin, a (meth)acryl UV curable resin, an epoxy resin, a phenoxy resin, a novolac resin, a silicone acrylate resin, a melamine resin, a phenol resin, an unsaturated polyester resin, a polyimide resin, a urethane resin and a urea resin. The thickness of the overcoat layer is generally 50 nm or less, preferably 30 nm or less, more preferably 15 nm or less, most preferably 6 nm or less. The overcoat layer may be composed of a single layer or multiple layers. Among the above-mentioned resins, for imparting stainproofing properties, a fluororesin, a moisture-curable silicone resin and a heat-curable silicone resin are preferred.

When the above-mentioned overcoat layer is formed on the surface of the antireflection film, the arithmetic mean surface roughness and the silicon atom content of the surface of the antireflection film are measured with respect to the surface of the overcoat layer as the uppermost layer of the antireflection film. When the overcoat layer is formed on the surface of an antireflection film, in general, a overcoat layer is formed on an antireflection film having an arithmetic mean surface roughness (Ra) of not more than 2 nm and a silicon atom content of 10 atom % or more, wherein these characteristics of the antireflection film are maintained even after the formation of the overcoat layer, for example by adjusting the thickness of the overcoat layer to a satisfactorily small value.

The antireflection film of the present invention has an arithmetic mean surface roughness (Ra) of not more than 2 nm, preferably not more than 1.5 nm, more preferably not more than 1 nm. When the arithmetic mean surface roughness (Ra) exceeds 2 nm, the abrasion resistance becomes lowered drastically. The arithmetic mean surface roughness (Ra) is measured using the below-mentioned scanning probe microscope.

In the present invention, the silicon atom content, as measured by X-ray photoelectron spectroscopy (XPS) with respect to the surface of the antireflection film, is 10 atom % or more, preferably 15 atom % or more. When the silicon atom content is less than 10 atom %, the surface hardness of the film becomes unsatisfactory and the abrasion resistance may become lowered.

During the measurement of the silicon atom content by X-ray photoelectron spectroscopy (XPS), the detected atoms are present at a depth of from about 1 to 10 nm from the surface of the antireflection film. The conditions for the XPS are as follows.

Apparatus: ESCALAB 250 (manufactured and sold by Thermo Electron K.K., Japan)
X-ray source: monochromatized AlKα 15 kV×10 mA
Analyzed area: oval shape (300 μm×600 μm)
Method for measurement: Survey Scan
Scanning range: 1,100 to 0 eV (C1S, O1s, Si2p)
Pass Energy: 100 eV In the present invention, during the measurement of the arithmetic mean surface roughness (Ra) and the silicon atom content, the point of measurement must be selected with care. This is because when the point of measurement is selected randomly, the measurement may be made with respect to an atypical point, such as an impurity, an agglomerate or a pinhole, and such measurement lowers the reliability of the obtained value. For obtaining a reliable value, for example, the measurement of the arithmetic mean surface roughness (Ra) can be performed by obtaining an image of a large area of the antireflection film; selecting several points of measurement from typical portions containing no impurities, agglomerates or pinholes; and taking a mean of the measured values to thereby obtain an arithmetic mean surface roughness (Ra). The same applies to the measurement of the silicon atom content. In general, several points of measurement are selected visually from typical portions containing no impurities, agglomerates or pinholes and, then, an average of the measured values is determined to thereby obtain a silicon atom content. Since substantially the same value is generally obtained for all points of measurement which are selected in the above-mentioned manner, even a value obtained from only one point of measurement is considered to be a satisfactorily reliable value.

The antireflection film of the present invention has a very smooth surface structure with only very small unevenness even when its silicon atom content is 100 atom % or a value close to 100 atom %. Despite of such a smooth surface structure, the antireflection film of the present invention has excellent abrasion resistance. It is considered that the excellent abrasion resistance of the antireflection film is imparted by the unique properties that the antireflection film exhibits not only very high surface hardness, but also other excellent properties that the silica particles present at the surface do not come off upon abrasion, and stress is not concentrated on a local point.

As explained above, conventionally, when the silica content of an antireflection film is increased to improve the antireflection properties and strength, a problem arises in that the abrasion resistance of the antireflection film becomes lowered. However, the present invention solves this problem by adjusting the silica particle content of the antireflection film to 30% by weight or more while maintaining the arithmetic mean roughness and the silicon atom content of the surface of the antireflection film within specific ranges.

Pores are not necessary in the antireflection film, but pores may be formed in the antireflection film for adjusting the refractive index of the film. The porosity is 0 to 70% by volume, preferably 1 to 60% by volume, more preferably 3 to 50% by volume, based on the volume of the antireflection film. When the porosity exceeds 70% by volume, the strength of the antireflection film becomes lowered. The porosity may be adjusted by selecting the form and amount of the silica particles and the type and amount of the binder compound used. It is desired that the refractive index of the antireflection film is adjusted within the range of from 1.22 to 1.55. The porosity can be calculated from the refractive index measured using a spectrophotometer.

In the present invention, 2 or more antireflection films may be laminated.

Further, the antireflection film of the present invention can be laminated directly or indirectly on a high refraction film which has a refractive index higher than the refractive index of the antireflection film, thereby obtaining an antireflection laminate film. Such an antireflection laminate film is preferred because it exhibits higher antireflection effects. The expression "laminating an antireflection film indirectly on a high refraction film" means that a predetermined layer (such as an antistatic layer or a hard coat layer explained below) having a thickness which does not impair the effects of the antireflection film is provided between the antireflection film and the high refraction film.

As the high refraction film, there can be used a film comprising conventional inorganic particles and a binder compound which binds the inorganic particles together. Examples of inorganic particles include particles of metal oxides or complex metal oxides comprising at least one metal selected from the group consisting of titanium, zirconium, zinc, cerium, tantalum, yttrium, hafnium, aluminum, magnesium, indium, tin, molybdenum, antimony and gallium. Among the above-mentioned metal oxides, zirconium oxide having high refractive index and light resistance is preferred. As the binder compound, there can be used the compounds (1) to (7) above which are exemplified as the binder compounds used for the antireflection film of the present invention. Among these, preferred are the hydrolyzable silane compound (2) having in the molecule thereof a polymerizable functional group and a functional group capable of covalently bonding to a silica particle, an organic polymer (selected form the organic polymer (5)) having a polymerizable functional group at a terminal or in the main chain thereof, the polymerizable monomer (6) and the curable resin (7). The type and amount of the binder compound are selected in accordance with the desired refractive index, strength, light resistance, yellowing resistance and the like, and conventional binder compounds may be used. The refractive index of the high refraction film is in the range of from 1.4 to 2.5, preferably from 1.55 to 2.5, more preferably from 1.6 to 1.9, and the thickness of the high refraction film is in the range of from 0.01 to 1 μm, preferably from 0.03 to 0.5 μm, more preferably from 0.05 to 0.2 μm. The refractive index and thickness of the high refraction film are selected in accordance with the refractive index and thickness of the antireflection film, the refractive index of the optical substrate, and the refractive index and thickness of other layers present in the antireflection laminate film. A laminate film, such as explained above, can be used advantageously as an antireflection film for optical substrates having various refractive indices.

Further, in the present invention, an antistatic layer provided below the antireflection film or the antireflection laminate film (that is, at the side facing the optical substrate) or provided between the antireflection film and the high refraction film, is advantageous for preventing dust from attaching to the antireflection film or the antireflection laminate film. As the antistatic layer, there can be used conventional antistatic agents, such as a surfactant and an ionic polymer; or a dispersion of conductive microparticles in a binder compound. Conventional conductive particles can be used as the conductive microparticles, and specific examples of conventional conductive particles include microparticles of oxides or complex oxides containing indium, zinc, tin, molybdenum, antimony or gallium; microparticles of metals, such as copper, silver, nickel and low melting point alloys (such as solder); polymeric microparticles coated with a metal; carbon blacks; conductive polymer particles, such as polypyrrole and polyaniline; metal fibers and carbon fibers. Among these, indium tin oxide (ITO) particles and antimony tin oxide (ATO) particles, both of which impart high transparency and conductivity, are preferred. The thickness of the antistatic layer is generally in the range of from 0.01 to 1 µm, preferably from 0.03 to 0.5 µm, most preferably from 0.05 to 0.2 µm. With respect to the binder compound contained in the antistatic layer, there can be used the compounds (1) to (7) above which are exemplified as the binder compounds used for the antireflection film of the present invention. Among these, preferred are the hydrolyzable-silane compound (2) having in the molecule thereof a polymerizable functional group and a functional group capable of covalently bonding to a silica particle, an organic polymer (selected from the organic polymer (5)) having a polymerizable functional group at a terminal or in the main chain thereof, the polymerizable monomer (6) and the curable resin (7).

In the present invention, a hard coat layer provided below the antireflection film or the antireflection laminate film, or provided between the antireflection film and the high refraction film is preferred for improving the pencil hardness and the impact resistance of the antireflection film or the antireflection laminate film. When an antistatic layer is provided, the hard coat layer is provided below the antistatic layer. A hard coat layer is formed by coating a conventional hard coat layer-forming material, such as a silicone material, a (meth)acrylic material, an epoxy material, a urethane material, an epoxy acrylate material and a urethane acrylate material. In addition, the hard coat layer can also be formed by coating a coating liquid which contains a multifunctional monomer and the like together with a polymerization initiator, wherein, after the coating of the coating liquid, the multifunctional monomer is caused to be polymerized, thereby forming a hard coat layer. The thickness of the hard coat layer is generally in the range of from 0.1 to 10 µm, preferably from 0.5 to 8 µm, more preferably from 1 to 6 µm, most preferably from 2 to 5 µm.

In the above-mentioned antistatic laminate film, two or all of the functions of the high refraction film, the antistatic layer and the hard coat layer may be carried by a single layer. For example, a layer containing a high refraction material and a conductive material may be provided as a high refraction layer having antistatic effect, and a conductive material may be added to the hard coat-forming material, so as to form an antistatic hard coat layer. The thickness of such an antistatic hard coat layer should be in the range which is described above for the (non-antistatic) hard coat layer.

Further, two or more layers of each of the antireflection film, the high refraction film, the antistatic layer and the hard coat layer may be present in the above-mentioned antireflection laminate film.

The antireflection film and the antireflection laminate film of the present invention can be advantageously used in the form of the optical part of the present invention which comprises an optical substrate and, laminated thereon, the antireflection film or the antireflection laminate film of the present invention. The optical part of the present invention exhibits excellent antireflection performance.

Specific examples of optical substrates used in the optical part of the present invention include a glass plate; various resin plates, resin sheets and resin films, such as a (meth)acrylic resin plate, a (meth)acrylic resin sheet, a styrene/methyl(meth)acrylate copolymer resin plate, a styrene/methyl(meth)acrylate copolymer resin sheet, a polyethylene film, a polypropylene film, cellulose acetate type films including a triacetyl cellulose film and a cellulose acetate propionate film, stretched polyester films including stretched films of polyethylene terephthalate and polyethylene naphthalate, polycarbonate films, norbornene films, polyarylate films and polysulfone films; optical substrates used in various application fields, such as the fields of eyesight-correcting articles (e.g., lenses of eye-glasses, lenses of goggles and contact lenses), automobiles (e.g., windows of an automobile, instrumental panels and a navigation system), housing and building (e.g., windowpane), agro-industrial products (e.g., a light-transmitting film or sheet for a plastic greenhouse), batteries (e.g., solar battery and photoelectric cell), electronic information appliances (e.g., a cathode-ray tube, a plasma display panel, a notebook computer, an electronic organizer, a touch screen, a liquid crystal display (LCD) television, an LCD monitor, an in-vehicle TV, an LCD camcorder, a projection television, an optical fiber and an optical disc), household articles (e.g., a lighting globe, a fluorescent light, a mirror and a clock), business articles (e.g., a showcase, a picture frame, semiconductor lithography and a copying machine), and amusement articles (e.g., a liquid crystal display game machine, a glass lid of a pinball machine, and game machines). All of these are light-transmitting optical substrates, which are required to be free from glaring and/or to have improved light transmittance.

With respect to the method for producing the optical part of the present invention, there is no particular limitation. However, when the optical part of the present invention is produced by using the below-mentioned transfer foil, there is an advantage in that the optical part having an antireflection film having an arithmetic mean surface roughness (Ra) of not more than 2 nm can be produced with ease. Alternatively, the optical part comprising an antireflection film having an arithmetic mean surface roughness (Ra) of not more than 2 nm can also be produced without using a transfer foil, but by employing a method in which an antireflection film is laminated onto an optical substrate directly or, if desired, indirectly through a hard coat layer, an antistatic layer and a high refraction film which are previously formed on the optical substrate. However, when an antireflection film is produced without the use of a transfer foil, it sometimes becomes difficult to satisfactorily increase the silicon atom content of the surface of the antireflection film because in general, silica particles have a specific gravity and a surface energy which are larger than those of a binder compound, so that the silica particles easily sink into the inner portion of the antireflection film. In addition, in the case where an antireflection film is laminated on top of a plurality of layers laminated on an optical substrate to thereby form an optical part, it sometimes becomes difficult to cause the antireflection film to have a small value of the arithmetic mean surface roughness (Ra) because in general, the non-uniformity in thickness and the dents and bumps of each layer become markedly accumulated in accordance with the increase in the number of layers laminated.

Hereinbelow, specific explanations are given with respect to the method for producing the antireflection film and the antireflection laminate film by using a transfer foil.

The transfer foil comprises a provisional substrate and, laminated thereon, the antireflection film or antireflection laminate film of the present invention. The transfer foil is used in a procedure which comprises the steps of: laminating the transfer foil on an optical substrate so that the surface (i.e., the antireflection film layer) of the transfer foil which is remote from the provisional substrate layer faces the optical substrate; and delaminating the provisional substrate layer of the transfer foil to thereby transfer the antireflection film or antireflection laminate film onto the optical substrate.

With respect to the material for the provisional substrate, there is no particular limitation, and any desired substrate can be used. For example, there can be used a glass plate, a metal plate, a (meth)acrylic resin sheet, a polyethylene film, a polypropylene film, cellulose acetate type films including a triacetyl cellulose film and a cellulose acetate propionate film, stretched polyester films including stretched films of polyethylene terephthalate and polyethylene naphthalate, polycarbonate films, norbornene films, polyarylate films and polysulfone films.

When using these provisional substrates, it is preferred that the surface thereof is as smooth as possible. For improving the smoothness of the surface of a provisional substrate, it is useful to subject the provisional substrate to a process for forming thereon the above-mentioned hard coat layer.

For improving the releasability between the provisional substrate and the antireflection film, there can be used a release layer sandwiched between the provisional substrate and the antireflection film. With respect to the material for the release layer, there is no particular limitation, and there can be used any conventional material, such as a fluororesin, a silicone resin, a (meth)acrylic resin and a melamine resin.

The arithmetic mean surface roughness (Ra) of the antireflection film of the present invention can be adjusted by appropriately controlling the wettability and adhesion property of the provisional substrate or the release layer with respect to the surface thereof to be adhered to the antireflection film. Specifically, for example, when a provisional substrate (e.g., a fluororesin) having a low surface energy is used, by employing a solvent or an additive each capable of lowering the surface energy of a coating composition for producing the antireflection film, the wettability of the provisional substrate or the release layer (with respect to the surface thereof to be adhered to the antireflection film) can be improved, thereby lowering the arithmetic mean surface roughness (Ra) of the antireflection film. On the other hand, when a low refraction layer (i.e., an antireflection film) having a relatively large (meth)acryl group content is used, by employing a release layer having a relatively small (meth)acryl group content, the adhesion strength of the release layer can be controlled to an appropriate level, thereby facilitating the release of the antireflection film and, hence, enabling a reduction in the arithmetic mean surface roughness (Ra) of the antireflection film.

The above-mentioned provisional substrate is coated with the above-mentioned coating composition containing silica particles, to thereby form an antireflection film thereon and obtain a transfer foil. If desired, optional layers, such as the above-mentioned high refraction film, antistatic layer and hard coat layer, may be laminated onto the antireflection film. In this case, by employing a hard coat layer having a satisfactory mechanical strength, an antireflection film having an improved mechanical strength can be obtained. Further, still other types of optional layers, such as a dye-containing layer and a UV absorber-containing layer, may be laminated onto the antireflection film as long as the effects of the present invention are not impaired.

The thus obtained transfer foil containing the antireflection film is laminated onto an optical substrate so that the antireflection film faces the optical substrate, followed by delamination of the provisional substrate, to thereby obtain an optical part. As an optical substrate, any of those exemplified above can be employed. If desired, various functional layers, such as a UV-absorbing layer, an electromagnetic wave-insulating layer, an infrared light-absorbing layer, a shock-absorbing layer and a toning layer, may be laminated on the optical substrate.

The lamination of the transfer foil onto the optical substrate is performed by adhering the transfer foil onto the optical substrate through an adhesive layer so that the surface (i.e., the antireflection film layer) of the transfer foil which is remote from the provisional substrate layer faces the optical substrate. With respect to the type of the adhesive layer, there is no particular limitation, and any conventional adhesive material, such as a glue, an adhesive sheet, a thermoplastic resin, a thermosetting resin or a radiation curable resin can be used, as long as the material is capable of adhering the optical substrate and the transfer foil to each other. From the viewpoint of improving the optical properties, it is preferred that the adhesive layer is transparent to visible light. With respect to the method for adhering the transfer foil onto the optical substrate, there is no particular limitation. Examples of methods for adhering include a method in which an adhesive is applied only onto a surface of the transfer foil, followed by lamination of the transfer foil onto the optical substrate, a method in which an adhesive is applied only onto a surface of the optical substrate, followed by lamination of the transfer foil onto the optical substrate, a method in which an adhesive is applied onto both of a surface of the transfer foil and a surface of the optical substrate, followed by lamination of the transfer foil onto the optical substrate, and a method in which an adhesive sheet is sandwiched between the transfer foil and the optical substrate to form a laminate.

After the transfer foil and the optical substrate are adhered to each other, the provisional substrate (together with a release layer if any) of the transfer foil is delaminated from the antireflection film of the transfer foil, thereby obtaining an optical part in which an antireflection film or antireflection laminate film is laminated on an optical substrate. In the case where a release layer is used, it is possible that, after the delamination of the release layer from the antireflection film, a residual portion of the release layer remains on the surface of the antireflection film or has penetrated and migrated into the surface portion of the antireflection film. Such a residual portion of the release layer may be left as it is, as long as the properties of the antireflection film suffer substantially no adverse effects; however, when there is a possibility that the properties of the antireflection film are adversely affected, such a residual portion of the release layer should be removed by washing with water or a solvent, wiping-off, heating, etching, ozonation or the like.

The optical part obtained by the above-mentioned method not only has a very smooth surface but also exhibits excellent abrasion resistance.

The antireflection film and the antireflection laminate film of the present invention can be formed on various types of optical substrates. In general, especially when the optical part of the present invention is produced by using the above-mentioned transfer foil, the antireflection film of the present invention can be formed on an optical substrate at a temperature in the range of from room temperature to 200° C. Therefore, the antireflection film of the present invention can be advantageously used especially for producing an optical part comprising a resin substrate having a low heat resistance and, laminated thereon, an antireflection film.

The optical part of the present invention has a minimum reflectance of not more than 2% within the visible light range. Therefore, for producing the optical part of the present invention, it is preferred that the thickness and refractive index of the antireflection film and the refractive index of layers other than the antireflection film are controlled so that the obtained optical part exhibits a minimum reflectance within the above-mentioned range. When the optical part has a minimum reflectance of more than 2% within the visible light range, it becomes difficult to perceive, with the naked eye, the effects obtained by forming the antireflection film of the present invention on the optical substrate.

The optical part of the present invention can achieve a maximum antireflection effect when the thickness and refractive index of the antireflection film (and the high refraction film if any) are controlled so that the obtained optical part exhibits a minimum refractive index at a wavelength of around 550 nm. Depending on the desired use of the optical part, the wavelength at which the optical part exhibits a minimum refractive index can be arbitrarily chosen. Specifically, for example, when the thickness and refractive index of the antireflection film are controlled so that the obtained optical part exhibits a minimum refractive index at a relatively short wavelength, the antireflection film assumes a reddish brown color to the naked eye. On the other hand, when the thickness and refractive index of the antireflection film are controlled so that the obtained optical part exhibits a minimum refractive index at a relatively long wavelength, the antireflection film assumes a blue color to the naked eye.

It is preferred that the optical part of the present invention which contains the antireflection film or the antireflection laminate film of the present invention has a pencil hardness of H or more, more advantageously 2H or more, most advantageously 3H or more. When the optical part of the present invention has a pencil hardness of H or more, the optical part can be advantageously used in the field of touch screens or the like which are frequently hit by, e.g., a finger or a stylus. Thus the application field of the optical part of the present invention expands. The pencil hardness of the optical part can be improved by optimizing the type and amount of the silica particles and the binder compound contained in the antireflection film. Alternatively, the pencil hardness of the optical part can also be improved by making appropriate selection of a hard coat layer or optical substrate under the antireflection film.

According to the present invention, it becomes possible to obtain an antireflection film having excellent abrasion resistance and a refletance of not more than 2%, most likely not more than 1%. Therefore, the antireflection film of the present invention and the optical part containing the same can be used in a considerably wide variety of application fields, such as the fields of a cathode-ray tube, an LCD monitor, a plasma display panel, a touch screen, a solar battery, windows of an automobile or a house, lenses of eyeglasses, and a showcase.

BEST MODE FOR CARRYING OUT THE INVENTION

Hereinbelow, the present invention will be described in more detail with reference to the following Synthesis Examples, Examples and Comparative Examples which should not be construed as limiting the scope of the present invention.

In the following Synthesis Examples, Examples and Comparative Examples, various measurements of the properties of the obtained antireflection films (or optical parts) were performed by the following methods.

(1) Evaluation of Arithmetic Mean Surface Roughness (Ra) Using a Scanning Probe Microscope The evaluation of the arithmetic mean surface roughness (Ra) was performed under the following conditions:

Apparatus: NanoScope® IIIa (manufactured and sold by Digital Instruments Inc., U.S.A.)
Cantilever: silicon single-crystal probe (model name: NCH-10T; manufactured and sold by NanoWorld AG, Switzerland)
Mode: tapping
Scan size: 1.0 μm
Scan rate: 1.0 Hz
Tip velocity: 2.0 μm/s
Set point: 1.5
Integral gain: 0.46
Proportional gain: 1.3
Image processing: flattening was performed at a flatten order of 0, thereby calibrating the image in the vertical direction thereof.

(2) Measurement of Silicon atom Content by X-ray Photoelectron Spectroscopy (XPS)

The silicon atom content was measured under the following conditions:

Apparatus: ESCALAB 250 (manufactured and sold by Thermo Electron K.K., Japan)
X-ray source: monochromatized AlKα 15 kV×10 mA
Analyzed area: oval shape (300 μm×600 μm)
Method for measurement: Survey Scan
Scanning range: 1,100 to 0 eV (C1S, O1s, Si2p)
Pass Energy: 100 eV.

(3) Measurement of Minimum Reflectance

Using a reflectance spectrometer (model name: FE-3000; manufactured and sold by Otsuka Electronics Co., Ltd., Japan), a reflectance spectrum (within the wavelength range of from 250 to 800 nm) of an optical part was obtained. The minimum value of reflectance in the reflectance spectrum was defined as the minimum reflectance of the optical part.

(4) Abrasion Resistance Test

The abrasion resistance was evaluated using a surface property testing machine (manufactured and sold by Imoto Machinery Co., Ltd., Japan), equipped with a stainless steel reciprocation rod having a diameter of 15 mm. Specifically, a steel wool (trade name: BONSTAR® #0000; manufactured and sold by Nihon Steel Wool K.K., Japan) was secured to the lower end of the reciprocation rod of the surface property testing machine, and the steel wool at the lower end of the rod was placed in contact with the surface of an antireflection film, whereupon the reciprocation rod having the steel wool at its lower end was actuated so that the steel wool was moved back and forth 10 times on the surface of the antireflection film while keeping the steel wool under a load of 200 g. Then, abrasion marks on the surface of the antireflection film were visually observed.

(5) Pencil Hardness

The pencil hardness was measured in accordance with JIS K5400, under a load of 1 kg.

SYNTHESIS EXAMPLE 1

89.1 g of an aqueous dispersion of moniliform silica strings which each comprise primary silica particles having an average particle diameter of about 12 nm and which have an average length of about 100 nm (trade name: Snowtex® OUP; manufactured and sold by Nissan Chemical Industries, Ltd., Japan) (solid silica content: 15.5% by weight), 68.1 g of a silica sol containing spherical silica particles having an average particle diameter of about 10 nm (trade name: Snowtex® OS; manufactured and sold by Nissan Chemical Industries, Ltd., Japan) (solid silica content: 20.3% by weight)) and 75.7 g of ethanol were mixed together at room temperature, and 17.1 g of 3-methacryloxypropyltrimethoxysilane (trade name: Sila-Ace; manufactured and sold by Chisso Corporation, Japan) was added thereto. The resultant mixture was stirred at 25° C. for 4 hours to effect a reaction, thereby obtaining a reaction mixture. On the other hand, 2 g of Irgacure® 369 (manufactured and sold by Ciba Specialty Chemicals, Japan) and 252 g of ethanol were mixed together to obtain a solution. Then, the obtained solution was added to 200 g of the above-obtained reaction mixture, and the resultant was stirred at room temperature for 5 minutes, thereby obtaining a solution having a solids content of 7.5% by weight. The obtained solution having a solids content of 7.5% by weight was diluted with isopropyl alcohol so as to reduce the solids content thereof to 3.4% by weight, thereby obtaining coating composition A for forming a low refraction layer.

SYNTHESIS EXAMPLE 2

92.9 g of a dispersion of tin-containing indium oxide particles (trade name: ELCOM V-2506; manufactured and sold by Catalysts & Chemicals Industries Co., Ltd., Japan) (solids content: 20.5% by weight) and 125.3 g of a dispersion of zinc oxide particles (trade name: ZNAP15WT %-G0; manufactured and sold by C. I. KASEI CO., LTD., Japan) were mixed together to obtain a mixture. On the other hand, 304.2 g of isopropyl alcohol, 33.8 g of ethylene glycol monobutyl ether and 23.9 g of water were mixed together to obtain a mixed solvent. Further, 9.9 g of an acrylic ultraviolet-curable resin (trade name: SANRAD™ RC-600; manufactured and sold by Sanyo Chemical Industries, Ltd., Japan) and 9.9 g of methyl ethyl ketone were mixed together to obtain a solution. Then, to the above-obtained mixture of a dispersion of tin-containing indium oxide particles and a dispersion of zinc oxide particles were added the above-obtained mixed solvent and the above-obtained solution in this order, and the resultant was stirred at room temperature, thereby obtaining a solution having a solids content of 8.0% by weight. Then, the obtained solution was diluted with a mixed solvent comprising isopropyl alcohol and ethylene glycol monobutyl ether ("isopropyl alcohol/ethylene glycol monobutyl ether" weight ratio: 9/1) so as to reduce the solids content of the solution to 6.0% by weight, thereby obtaining coating composition B for forming a high refraction layer having an antistatic effect.

EXAMPLE 1

The transfer foil C shown in FIG. 1 was produced as follows.

A surface of a biaxially oriented polyethylene terephthalate film (provisional substrate) 1 (thickness: 50 μm) was coated with a 50% by weight methyl ethyl ketone solution of an acrylic UV curable resin (solids content: 100% by weight) (SANRAD (tradename) RC-600; manufactured and sold by Sanyo Chemical Industries, Ltd., Japan) using a bar coater (equipped with #7 rod; manufactured and sold by R. D. Specialties, Inc., U.S.A.). Then, the resultant coating on the polyethylene terephthalate film was cured by irradiating ultraviolet rays (integrated optical power: 250 mJ/cm$^2$) using a UV curing machine (LC-6B type; manufactured and sold by Fusion UV Systems Japan K.K., Japan) under conditions wherein the intensity is 180 W, the rate of the conveyer is 12 m/minute and the distance from the light source is 53 mm. This UV irradiation operation was performed three times, thereby forming release layer 2 on the provisional substrate.

Composition A for forming a low refraction layer was coated on the above-mentioned release layer 2 using a bar coater (equipped with #4 rod; manufactured and sold by R. D. Specialties, Inc., U.S.A.), followed by heat drying at 120° C. for 2 minutes in a recirculating, hot air dryer. Then, the resultant dried coating was cured by irradiating ultraviolet rays (integrated optical power: 250 mJ/cm$^2$) using a UV curing machine (LC-6B type; manufactured and sold by Fusion UV Systems Japan K.K., Japan) under conditions wherein the intensity is 180 W, the rate of the conveyer is 12 m/minute and the distance from the light source is 53 mm. This UV irradiation operation was performed three times, thereby forming low refraction layer (antireflection film) 3 on release layer 2.

Composition B for forming a high refraction layer having an antistatic effect was coated on the above-mentioned antireflection film 3 using a bar coater (equipped with #4 rod; manufactured and sold by R. D. Specialties, Inc., U.S.A.). Then, the resultant coating was cured by irradiating ultraviolet rays (integrated optical power: 250 mJ/cm$^2$) using a UV curing machine (LC-6B type; manufactured and sold by Fusion UV Systems Japan K.K., Japan) under conditions wherein the intensity is 180 W, the rate of the conveyer is 12 m/minute and the distance from the light source is 53 mm. This UV irradiation operation was performed three times, thereby forming high refraction layer (high refraction film) 4 on antireflection layer 3.

Subsequently, urethane acrylate hard coat layer 5 (thickness: 5 μm) and thermoplastic urethane adhesive layer 6 (thickness: 2 μm) were formed in this order on the above-mentioned high refraction layer 4, thereby obtaining transfer foil C.

Figure 2:
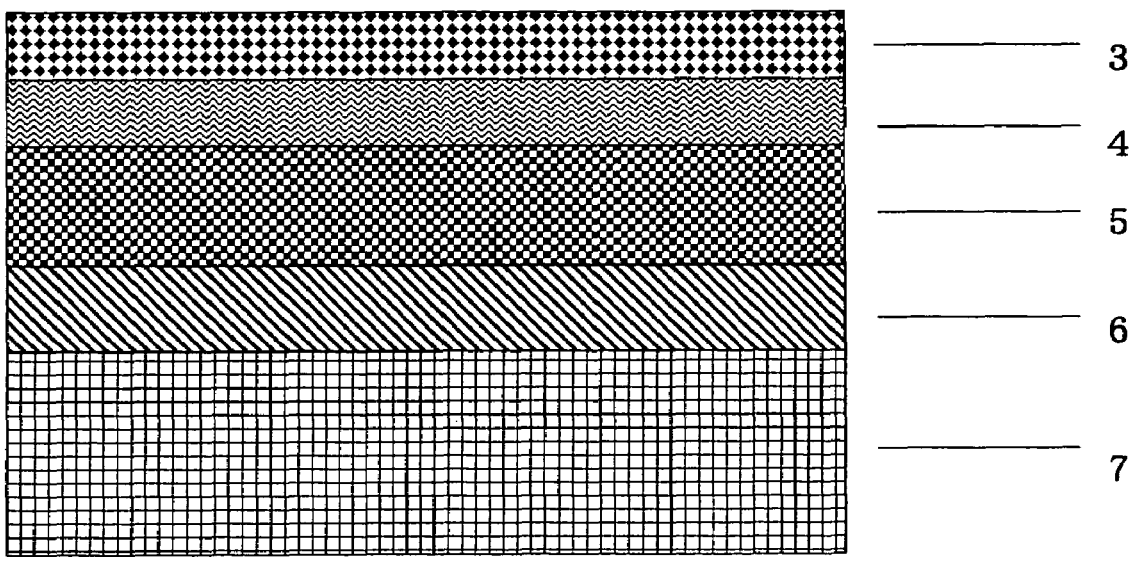
FIG. 2 is a diagrammatic view showing the laminate structure of the optical part D produced in Example 1.

The obtained transfer foil C was laminated with a 2 mm-thick polymethyl methacrylate-plate 7 (Delaglass® A; manufactured and sold by Asahi Kasei Chemicals Corporation, Japan) (optical substrate) so that adhesive layer 6 of the transfer foil C was placed in contact with polymethyl methacrylate plate 7, and the resultant was subjected to a rolling treatment using a laminator (MA II-550 type; manufactured and sold by Taisei Laminator K.K., Japan) under conditions wherein the roller temperature is 230° C., the roller pressure is 1 kg and the feeding rate is 0.8 mm/second, to thereby perform a film transfer operation and obtain a laminate. The obtained laminate was cooled to room temperature, and polyethylene terephthalate film 1 and release layer 2 were released and removed from the laminate, thereby obtaining optical part D shown in FIG. 2.

The characteristics of the optical part D are as shown in Table 1. The arithmetic mean surface roughness (Ra) was as small as 0.5 nm and the silicon atom content was as high as 21.6 atom %. The minimum reflectance was only 0.82% and exhibited excellent antireflection properties. Further, in the abrasion resistance test, no abrasion marks or no discoloration were observed, indicating that the optical part D had high strength.

COMPARATIVE EXAMPLE 1

Urethane acrylate hard coat layer 5 (thickness: 5 μm) was formed on a 2 mm-thick polymethyl methacrylate plate 7 (Delaglass® A; manufactured and sold by Asahi Kasei Chemicals Corporation, Japan) (optical substrate), thereby obtaining a substrate having hard coat layer 5 formed thereon.

Composition B for forming a high refraction layer having an antistatic effect was coated on the above-mentioned hard coat layer 5 using a bar coater (equipped with #4 rod; manufactured and sold by R. D. Specialties, Inc., U.S.A.). Then, the resultant coating was cured by irradiating ultraviolet rays (integrated optical power: 250 mJ/cm2) using a UV curing machine (LC-6B type; manufactured and sold by Fusion UV Systems Japan K.K., Japan) under conditions wherein the intensity is 180 W, the rate of the conveyer is 12 m/minute and the distance from the light source is 53 mm. This UV irradiation operation was performed three times, thereby forming high refraction layer 4 having an antistatic effect, on hard coat layer 5.

Figure 3:
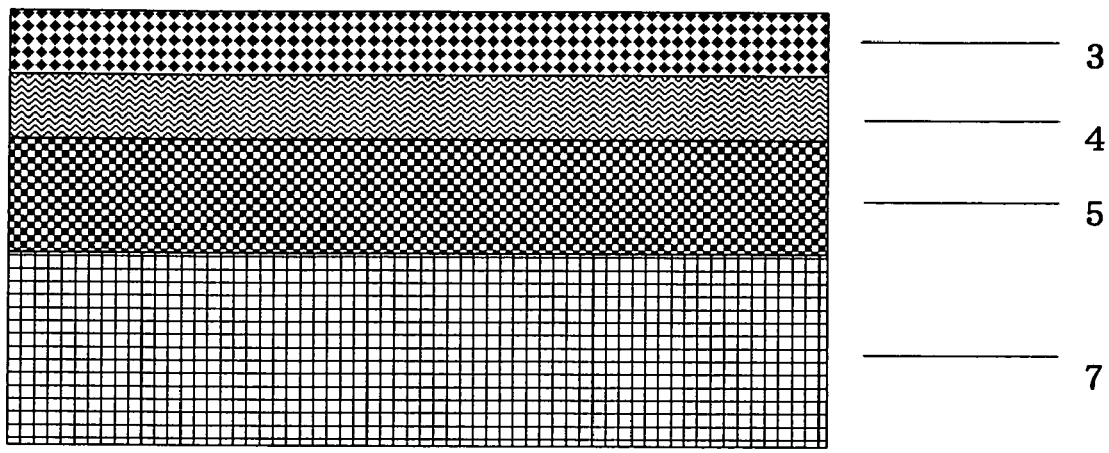
FIG. 3 is a diagrammatic view showing the laminate structure of the optical part E produced in Comparative Example 1.

Composition A for forming a low refraction layer was coated on the above-mentioned high refraction layer 4 (having an antistatic effect) using a bar coater (equipped with #4 rod; manufactured and sold by R. D. Specialties, Inc., U.S.A.), followed by heat drying at 120° C. for 2 minutes in a recirculating, hot air dryer. Then, the resultant dried coating was cured by irradiating ultraviolet rays (integrated optical power: 250 mJ/cm$^2$) using a UV curing machine (LC-6B type; manufactured and sold by Fusion UV Systems Japan K. K., Japan) under conditions wherein the intensity is 180 W, the rate of the conveyer is 12 m/minute and the distance from the light source is 53 mm. This UV irradiation operation was performed three times to form low refraction layer (antireflection film) 3 on high refraction layer 4, thereby obtaining optical part E shown in FIG. 3.

The characteristics of the optical part E are as shown in Table 1. Although the silicon atom content was 22.7 atom % which is substantially the same as that of the optical part D produced in Example 1, the arithmetic mean surface roughness (Ra) was as large as 2.3 nm. The minimum reflectance was 0.82%, which is the same as that of the optical part D produced in Example 1. However, in the abrasion resistance test, many abrasion marks and discoloration were observed.

SYNTHESIS EXAMPLE 3

2.0 g of an aqueous dispersion of moniliform silica strings which each comprise primary silica particles having an average particle diameter of about 12 nm and which have an average length of about 100 nm (trade name: Snowtex® OUP; manufactured and sold by Nissan Chemical Industries, Ltd., Japan) (solid silica content: 15.5% by weight) was mixed with 18 g of ethanol at room temperature, to thereby obtain a water/ethanol dispersion of moniliform silica strings which has a solid silica content of 1.5% by weight. To the obtained water/ethanol dispersion of moniliform silica strings was added 0.104 g of tetraethoxysilane and 0.015 g of a 1N nitric acid, and the resultant was stirred at room temperature overnight, thereby obtaining coating composition F for forming a low refraction layer.

EXAMPLE 2

Figure 4:
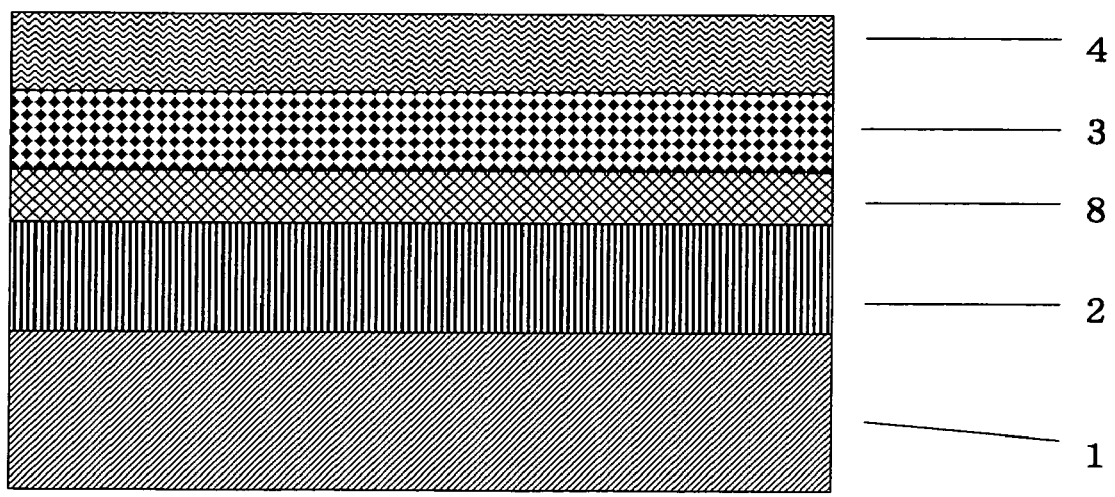
FIG. 4 is a diagrammatic view showing the laminate structure of the transfer foil G produced in Example 2.

The transfer foil G shown in FIG. 4 was produced as follows.

A surface of a biaxially oriented polyethylene terephthalate film (provisional substrate) 1 (thickness: 50 μm) was coated with a 50% by weight methyl ethyl ketone solution of an acrylic UV curable resin (solids content: 100% by weight) (SANRAD (tradename) RC-600; manufactured and sold by Sanyo Chemical Industries, Ltd., Japan) using a bar coater (equipped with #7 rod; manufactured and sold by R. D. Specialties, Inc., U.S.A.). Then, the resultant coating on the polyethylene terephthalate film was cured by irradiating ultraviolet rays (integrated optical power: 350 mJ/cm$^2$) using a UV curing machine (UVC-2519 type, equipped with a high pressure mercury lamp; manufactured and sold by Ushio Inc., Japan) under conditions wherein the intensity is 160 W, the rate of the conveyer is 4.6 m/minute and the distance from the light source is 100 mm. This UV irradiation operation was performed three times, thereby forming release layer 2 on the provisional substrate. Subsequently, a 1.0% methyl isobutyl ketone solution of a fluorine-containing surfactant (Fluorad (tradename) FC-4430; manufactured and sold by Sumitomo 3M, Ltd., Japan) was coated on the above-mentioned release layer 2 by spin coating at 1000 rpm for 30 seconds, followed by heat drying at 120° C. for 2 minutes in a recirculating, hot air dryer, thereby forming fluorine-containing surfactant layer 8 on release layer 2.

Composition F for forming a low refraction layer was coated on the above-mentioned fluorine-containing surfactant layer 8 by spin coating at 1000 rpm for 30 seconds, followed by heat drying at 120° C. for 2 minutes in a recirculating, hot air dryer, thereby forming low refraction layer (antireflection film) 3 on fluorine-containing surfactant layer 8.

Subsequently, a 2.0% ethanol dispersion of microparticulate complex oxide of antimony (Celnax® CX-Z401M; manufactured and sold by NISSAN CHEMICAL INDUSTRIES, LTD., Japan) was coated on the above-mentioned low refraction layer 3 by spin coating at 1000 rpm for 30 seconds, followed by heat drying at 120° C. for 2 minutes in a recirculating, hot air dryer to form a high refraction layer 4 having an antistatic effect, thereby obtaining transfer foil G.

Figure 5:
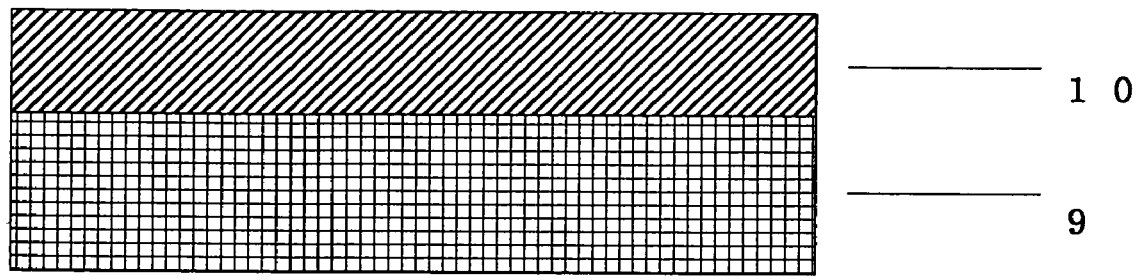
FIG. 5 is a diagrammatic view showing the laminate structure of the laminate H produced in Example 2.

On the other hand, laminate H shown in FIG. 5 was produced as follows.

A surface of a biaxially oriented polyethylene terephthalate film 9 (thickness: 188 μm) (Cosmoshine (registered tradename) A4300; manufactured and sold by Toyobo, Ltd., Japan) (optical substrate) was coated with an acrylic UV curable resin (ACH-01; manufactured and sold by Nippon Kayaku Co., Ltd., Japan) by spin coating at 1000 rpm for 30 seconds, followed by heat drying at 120° C. for 1 minute in a recirculating, hot air dryer, thereby forming ultraviolet-curable resin layer 10 on the optical substrate. The resultant optical substrate was used as laminate H.

Figure 6:
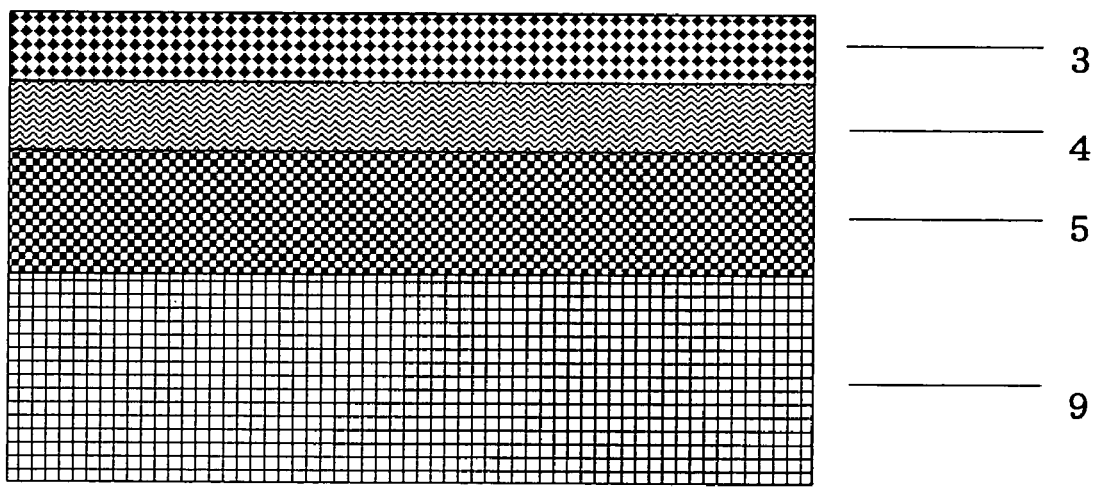
FIG. 6 is a diagrammatic view showing the laminate structure of the optical part I produced in Example 2.

The transfer foil G and the laminate H were laid on each other so that high refraction layer 4 (having an antistatic effect) of the transfer foil G was placed in contact with ultraviolet-curable resin layer 10 of the laminate H, and the resultant was subjected to contact bonding using a rubber roller, thereby obtaining a laminate. Subsequently, ultraviolet-curable resin layer 10 of the obtained laminate was cured by irradiating ultraviolet rays (integrated optical power: 350 mJ/cm$^2$) using a UV curing machine (UVC-2519 type, equipped with a high pressure mercury lamp; manufactured and sold by Ushio Inc., Japan) under conditions wherein the intensity is 160 WI the rate of the conveyer is 4.6 m/minute and the distance from the light source is 100 mm. This UV irradiation operation was performed three times to cure the ultraviolet-curable resin layer 10, thereby obtaining hard coat layer 5 (which was an ultraviolet-cured resin layer). Then, polyethylene terephthalate film 1 (provisional substrate), release layer 2 and fluorine-containing surfactant layer 8, which were contained in the transfer foil G, were released and removed from the laminate, thereby obtaining optical part I shown in FIG. 6.

The characteristics of the optical part I are as shown in Table 1. The arithmetic mean surface roughness (Ra) was as small as 0.9 nm and the silicon atom content was as high as 16.1 atom %. The minimum reflectance was only 1.00% and exhibited excellent antireflection properties. Further, in the abrasion resistance test, no abrasion marks or no discoloration were observed, indicating that the optical part I had high strength.

COMPARATIVE EXAMPLE 2

Figure 7:
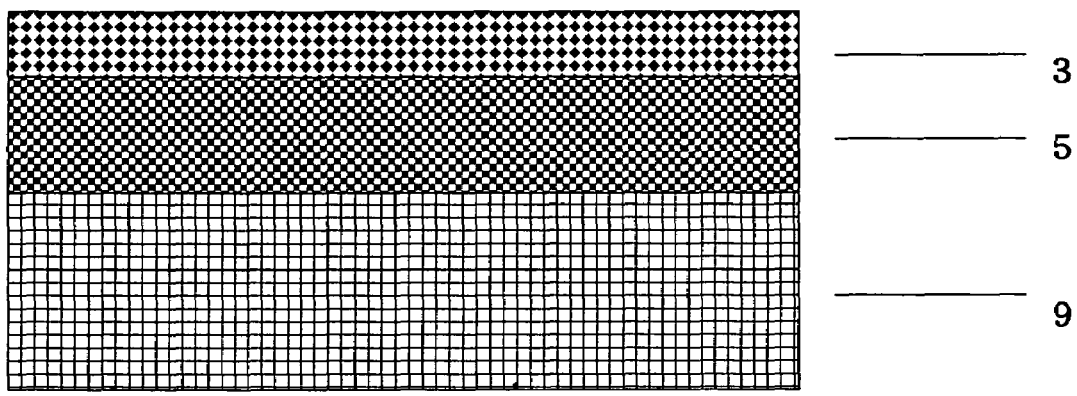
FIG. 7 is a diagrammatic view showing the laminate structure of the optical part J produced in Comparative Example 2.

The optical part J shown in FIG. 7 was produced as follows.

A surface of a biaxially oriented polyethylene terephthalate film 9 (thickness: 188 µm) (Cosmoshine (registered tradename) A4300; manufactured and sold by Toyobo, Ltd., Japan) (optical substrate) was coated with a 50% by weight methyl ethyl ketone solution of an acrylic UV curable resin (solids content: 100% by weight) (SANRADT RC-600; manufactured and sold by Sanyo Chemical Industries, Ltd., Japan) using a bar coater (equipped with #7 rod; manufactured and sold by R. D. Specialties, Inc., U.S.A.). Then, the resultant coating on the polyethylene terephthalate film was cured by irradiating ultraviolet rays (integrated optical power: 350 mJ/cm$^2$) using a UV curing machine equipped with a high-pressure mercury lamp (UVC-2519 type; manufactured and sold by USHIO INC., Japan) under conditions wherein the intensity is 160 W, the rate of the conveyer is 4.6 m/minute and the distance from the light source is 100 mm. This UV irradiation operation was performed three times, thereby forming hard coat layer 5 on the optical substrate.

Coating composition F for forming a low refraction layer was spin-coated on hard coat layer 5 at room temperature, at 1,000 rpm for 30 seconds. Then, the resultant coating was heat dried at 120° C. for 2 minutes in a recirculating, hot air dryer to obtain low refraction layer (antireflection film) 3 on hard coat layer 5, thereby obtaining optical part J.

The characteristics of the optical part J are as shown in Table 1. The silicon atom content was as high as 28.3 atom %; however, the arithmetic mean surface roughness (Ra) was as high as 4.0 nm disadvantageously. Further, the minimum reflectance was only 0.20%; however, in the abrasion resistance test, many abrasion marks and discoloration were observed.

SYNTHESIS EXAMPLE 4

0.1 g of dipentaerythritol hexaacrylate, 0.025 g of a silica sol containing silica particles having an average particle diameter of approximately from 10 to 20 nm (Snowtex® 0; manufactured and sold by Nissan Chemical Industries, Ltd., Japan) (solid silica content: 20% by weight), 0.01 g of Irgacure® 369 (manufactured and sold by Ciba Specialty Chemicals, Japan) and 6.9 g of isopropyl alcohol were mixed together while stirring at room temperature for 5 minutes, thereby obtaining a coating composition K for forming a low refraction layer.

COMPARATIVE EXAMPLE 3

Figure 8:
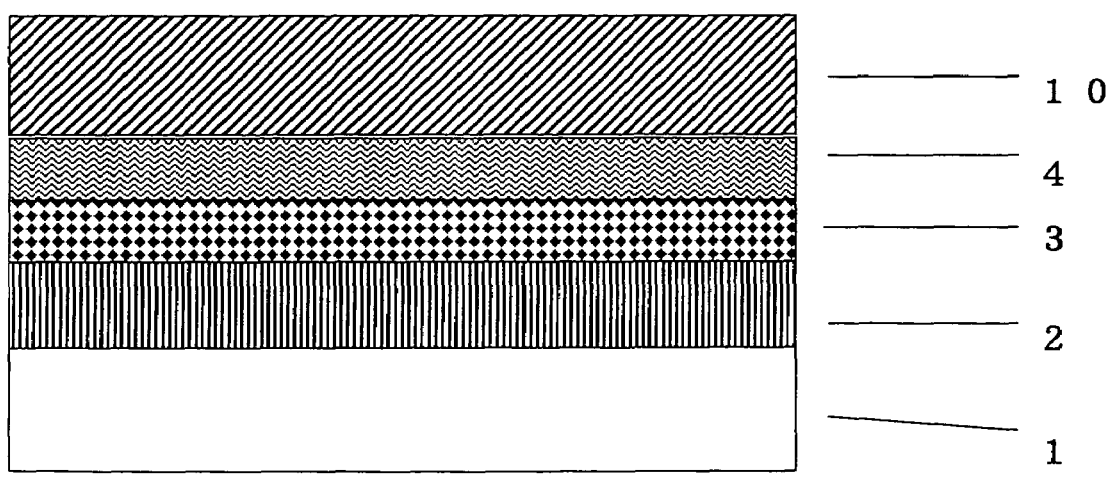
FIG. 8 is a diagrammatic view showing the laminate structure of the transfer foil L produced in Comparative Example 3.

The transfer foil L shown in FIG. 8 was produced as follows.

A surface of a biaxially oriented polyethylene terephthalate film (provisional substrate) 1 (trade name: COSMOSHINE ® A4300; manufactured and sold by Toyobo Co., Ltd., Japan) (thickness: 188 µm) was spin-coated with a 50% by weight methyl ethyl ketone solution of an acrylic UV curable resin (solids content: 100% by weight) (SANRAD$^{TM}$ RC-600; manufactured and sold by Sanyo Chemical Industries, Ltd., Japan) at room temperature, at 1,500 rpm for 1 second. Then, the resultant coating on the polyethylene terephthalate film was cured by irradiating ultraviolet rays (integrated optical power: 350 mJ/cm$^2$) using a UV curing machine equipped with a high-pressure mercury lamp (UVC-2519 type; manufactured and sold by USHIO INC., Japan) under conditions wherein the intensity is 160 W, the rate of the conveyer is 4.6 m/minute and the distance from the light source is 100 mm. This UV irradiation operation was performed three times, thereby forming release layer 2 on the provisional substrate.

Release layer 2 was spin-coated with coating composition K for forming a low refraction layer at room temperature, at 1,500 rpm for 1 second, followed by heat drying at 120° C. for 2 minutes in a recirculating, hot air dryer. Then, the resultant coating on release layer 2 was cured by irradiating ultraviolet rays (integrated optical power: 350 mJ/cm$^2$) using a UV curing machine equipped with a high-pressure mercury lamp (UVC-2519 type; manufactured and sold by USHIO INC., Japan) under conditions wherein the intensity is 160 W, the rate of the conveyer is 4.6 m/minute and the distance from the light source is 100 mm. This UV irradiation operation was performed three times, thereby forming thereby forming low refraction layer (antireflection film) 3 on release layer 2.

Composition B for forming a high refraction layer having an antistatic effect was spin-coated on the above-mentioned antireflection film 3 at room temperature, at 2,300 rpm for 1 second. Then, the resultant coating on antireflection film 3 was cured by irradiating ultraviolet rays (integrated optical power: 350 mJ/cm$^2$) using a UV curing machine equipped with a high-pressure mercury lamp (UVC-2519 type; manufactured and sold by USHIO INC., Japan) under conditions wherein the intensity is 160 W, the rate of the conveyer is 4.6 m/minute and the distance from the light source is 100 mm. This UV irradiation operation was performed three times, thereby forming, on antireflection film 3, high refraction layer 4 having an antistatic effect.

The above-mentioned high refraction layer 4 having an antistatic effect was spin-coated with a 50% by weight methyl ethyl ketone solution of an acrylic UV curable resin (solids content: 100% by weight) (SANRAD RC-600; manufactured and sold by Sanyo Chemical Industries, Ltd., Japan) at room temperature, at 1,500 rpm for 1 second to form ultraviolet-curable resin layer 10 on high refraction layer 4, thereby obtaining transfer foil L.

Figure 9:
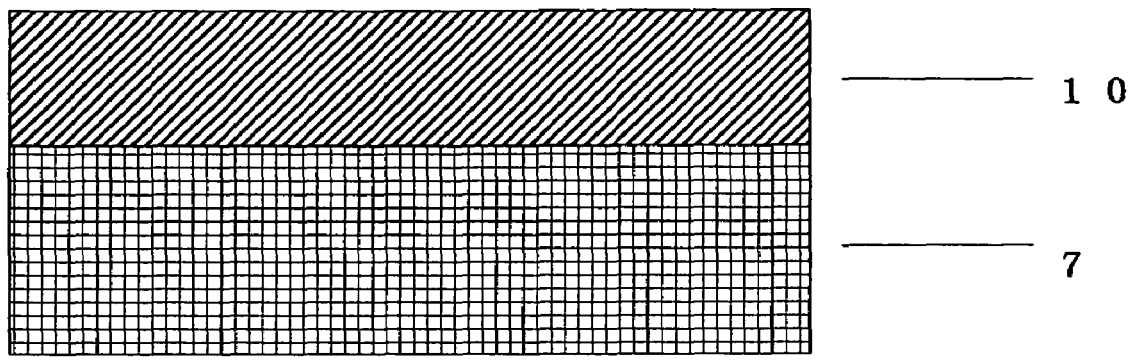
FIG. 9 is a diagrammatic view showing the laminate structure of the laminate M produced in Comparative Example 3.

On the other hand, laminate M shown in FIG. 9 was produced as follows.

A surface of 2 mm-thick polymethyl methacrylate plate (optical substrate) 7 (Delaglass® A; manufactured and sold by Asahi Kasei Chemicals Corporation, Japan) was spin-coated with a 50% by weight methyl ethyl ketone solution of an acrylic UV curable resin (solids content: 100% by weight) (SANRAD (tradename) RC-600; manufactured and sold by Sanyo Chemical Industries, Ltd., Japan) at room temperature, at 1,500 rpm for 1 second to form ultraviolet-curable resin layer 10 on polymethyl methacrylate plate 7, thereby obtaining laminate M.

Figure 10:
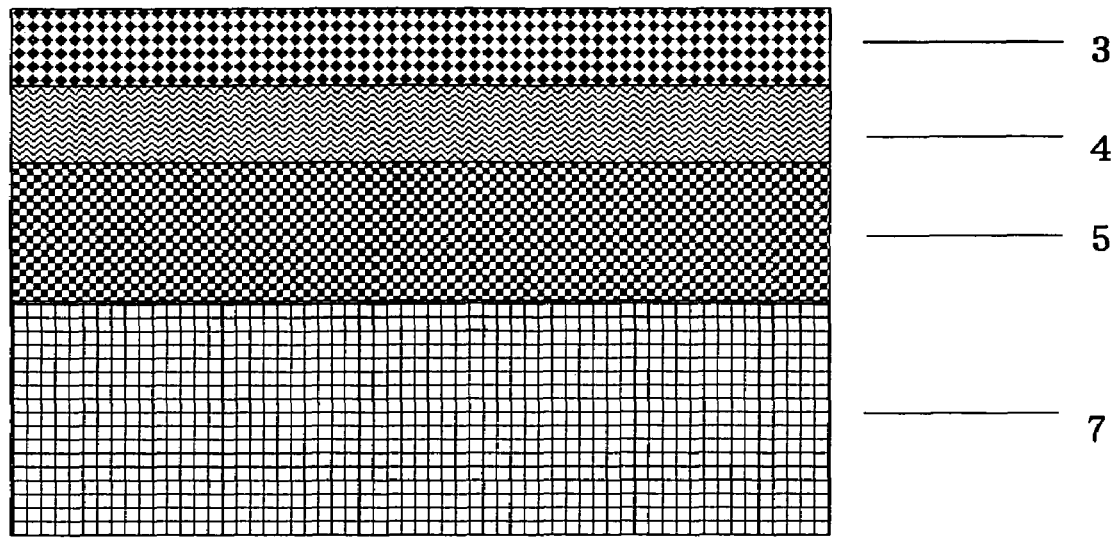
FIG. 10 is a diagrammatic view showing the laminate structure of the optical part N produced in Comparative Example 3.

Subsequently, transfer foil L and laminate M were laid on each other so that ultraviolet-curable resin layer 10 of transfer foil L was placed in contact with ultraviolet-curable resin layer 10 of polymethyl methacrylate plate 7, and the resultant was subjected to contact bonding using a rubber roller, to thereby form a laminate having a single, ultraviolet-curable resin layer 10. Then, the ultraviolet-curable resin layer 10 of the laminate was cured by irradiating ultraviolet rays (integrated optical power: 350 mJ/cm$^2$) using a UV curing machine equipped with a high-pressure mercury lamp (UVC-2519 type; manufactured and sold by USHIO INC., Japan) under conditions wherein the intensity is 160 W, the rate of the conveyer is 4.6 m/minute and the distance from the light source is 100 mm. This UV irradiation operation was performed three times to convert ultraviolet-curable resin layer 10 into hard coat layer 5. From this laminate, polyethylene terephthalate film 1 (provisional substrate) and release layer 2 (on the side of transfer foil L) were released and removed, thereby obtaining optical part N shown in FIG. 10.

The characteristics of the optical part N are as shown in Table 1. The arithmetic mean surface roughness (Ra) was as small as 0.9 nm; however, the silicon atom content was as low as 9.2 atom % disadvantageously. The minimum reflectance was 1.41%. Further, in the abrasion resistance test, no discoloration was observed; however, many abrasion marks were observed.

TABLE 1

| | Minimum Reflectance (%) | Wavelength at which the reflectance becomes minimum (nm) | Arithmetic mean roughness (Ra) (nm) | Silicon atom content (atom %) | Abrasion resistance | Pencil hardness |
|---|---|---|---|---|---|---|
| Example 1 | 0.82 | 531 | 0.5 | 21.6 | No abrasion marks or no discoloration observed | |
| Example 2 | 1.00 | 600 | 0.9 | 16.1 | No abrasion marks or no discoloration observed | 3H |
| Comp. Ex. 1 | 0.82 | 518 | 2.3 | 22.7 | Many abrasion marks and discoloration observed | |
| Comp. Ex. 2 | 0.20 | 450 | 4.0 | 28.3 | Many abrasion marks and discoloration observed | 2H |
| Comp. Ex. 3 | 1.41 | 560 | 0.9 | 9.2 | No discoloration observed, but many abrasion marks observed | |

INDUSTRIAL APPLICABILITY

The antireflection film of the present invention not only exhibits excellent antireflection performance, but also has excellent properties with respect to mechanical strength and abrasion resistance. Therefore, the antireflection film of the present invention is very advantageous for coating various optical substrates (such as a cathode-ray tube, an LCD monitor, a plasma display panel, a touch screen, a solar battery, windows of an automobile or a house, lenses of eye-glasses, and a showcase).

The invention claimed is:

1. An antireflection film comprising silica particles and at least one binder compound, wherein said silica particles are bound together through said at least one binder compound, said antireflection film having the following characteristics (a) to (c):
   (a) a silica particle content of 30% by weight or more, based on the weight of the antireflection film,
   (b) an arithmetic mean surface roughness (Ra) of not more than 1.5 nm,
   (c) a silicon atom content of 10 atom % or more, as measured by X-ray photoelectron spectroscopy (XPS) with respect to the surface of the antireflection film, and
   (d) a reflectance of not more than 1%.

2. The antireflection film according to claim 1, wherein said at least one binder compound is a polymer having functional groups, and wherein said silica particles are covalently bonded to the functional groups of said polymer.

3. The antireflection film according to claim 2, wherein the molar ratio of the functional groups of said polymer to the silicon atoms present in said silica particles is from 0.01 to 5.

4. The antireflection film according to claim 1, wherein said silica particles comprise at least one stringy silica particle selected from the group consisting of a moniliform silica swing and a fibrous silica particle.

5. The antireflection film according to claim 4, wherein said at least one stringy silica particle is present in an amount of 50% by weight or less, based on the weight of the antireflection film.

6. The antireflection film according to claim 1, which is porous and has a porosity of from 3 to 50% by volume.

7. An antireflection laminate film comprising a high refraction film and, laminated thereon directly or indirectly, the antireflection film of any one of claims 1 to 6, wherein said high refraction film has a refractive index higher than the refractive index of said antireflection film.

8. The antireflection laminate film according to claim 7, wherein said high refraction film comprises:
   particles of at least one metal oxide comprising at least one metal selected from the group consisting of titanium, zirconium, zinc, cerium, tantalum, yttrium, hafnium, aluminum, magnesium, indium, tin, molybdenum, antimony and gallium, and
   at least one binder compound,
   wherein said particles of at least one metal oxide are bound together through said at least one binder compound.

9. An optical part comprising an optical substrate and, laminated thereon, the antireflection film of any one of claims 1 to 6.

10. The optical part according to claim 9, wherein said optical substrate is a transparent resin substrate.

11. The optical part according to claim 9, which has a minimum reflectance of not more than 2% within the visible light range.

12. The optical part according to claim 9, which has a pencil hardness of 2H or more.

13. The optical part according to claim 9, which is obtained by a method comprising:
   (1) forming the antireflection film of any one of claims 1 to 6 on a provisional substrate having releasability with respect to said antireflection film, to thereby obtain a laminate (i);
   (2) laminating an optical substrate on the antireflection film of said laminate (i) to obtain a laminate (ii); and
   (3) delaminating the provisional substrate from said laminate (ii) to obtain an optical part.

14. An optical part comprising an optical substrate and, laminated thereon, the antireflection laminate film of claim 7.

15. The optical part according to claim 14, wherein said optical substrate is a transparent resin substrate.

16. The optical part according to claim 14, which has a minimum reflectance of not more than 2% within the visible light range.

17. The optical part according to claim 14, which has a pencil hardness of 2H or more.

18. The optical part according to claim 14, which is obtained by a method comprising:

(1) forming the antireflection film of any one of claims 1 to 6 on a provisional substrate having releasability with respect to said antireflection film, to thereby obtain a laminate (I);

(2) laminating a high refraction film on the antireflection film of said laminate (I) to obtain a laminate (II);

(3) laminating an optical substrate on the high refraction film of said laminate (II) to obtain a laminate (III); and (4) delaminating the provisional substrate from said laminate (III) to obtain an optical part.

* * * * *